(12) United States Patent
Sakai et al.

(10) Patent No.: US 9,228,753 B2
(45) Date of Patent: Jan. 5, 2016

(54) VENTILATION SYSTEM

(75) Inventors: Gakuto Sakai, Osaka (JP); Akihiro Eguchi, Osaka (JP); Tomohiro Yabu, Osaka (JP)

(73) Assignee: DAIKIN INDUSTRIES, LTD., Osaka-Shi (JP)

( * ) Notice: Subject to any disclaimer, the term of this patent is extended or adjusted under 35 U.S.C. 154(b) by 0 days.

(21) Appl. No.: 13/980,658

(22) PCT Filed: May 7, 2012

(86) PCT No.: PCT/JP2012/002990
§ 371 (c)(1),
(2), (4) Date: Jul. 19, 2013

(87) PCT Pub. No.: WO2012/153512
PCT Pub. Date: Nov. 15, 2012

(65) Prior Publication Data
US 2013/0303074 A1 Nov. 14, 2013

(30) Foreign Application Priority Data

May 12, 2011 (JP) ................ 2011-107085

(51) Int. Cl.
*F24F 11/00* (2006.01)
*F24F 7/06* (2006.01)
(Continued)

(52) U.S. Cl.
CPC ............. *F24F 11/0079* (2013.01); *F24F 3/147* (2013.01); *F24F 3/1417* (2013.01);
(Continued)

(58) Field of Classification Search
CPC ....... F24F 11/0079; F24F 11/01; F24F 11/09; F24F 11/17; F24F 11/22; F24F 11/26; F24F 11/34; F24F 11/36; F24F 11/61; F24F 11/79; F24F 2011/0061; E21F 1/02; G05B 15/02; G05B 17/02; H02J 3/14; Y02B 70/3275; Y04S 20/244
USPC ......... 454/256, 232, 239, 251, 258, 284, 229, 454/370, 56; 236/49.3, 1 B, 47; 700/277, 700/276
See application file for complete search history.

(56) References Cited

U.S. PATENT DOCUMENTS 4,181,099 A * 1/1980 Binstock .................... 122/448.1
4,308,911 A * 1/1982 Mandl .......................... 165/209
(Continued)

FOREIGN PATENT DOCUMENTS

EP 1698834 A1 9/2006
JP 4-322679 A 11/1992
(Continued)

OTHER PUBLICATIONS

Laboratory Methods of Testing Fans for Aerodynamic Performance Rating, ANSI/AMCA 210-99, ANSI/ASHRAE 51-1999, Air Movement and Control Association International, Inc., 2000.*

*Primary Examiner* — Alissa Tompkins
*Assistant Examiner* — Anthony Kandare
(74) *Attorney, Agent, or Firm* — Birch, Stewart, Kolasch & Birch, LLP

(57) ABSTRACT

A ventilation system includes a connection determinator configured to determine that N-th, second, and sixth humidity controlling ventilation devices are connected to an identical second duct bank in a situation where when fans of the second and sixth humidity controlling ventilation devices are driven, and the rotational speed of a fan of the N-th humidity controlling ventilation device is changed, a power detector detects fluctuations in the power consumed by the fan of each of the second and sixth humidity controlling ventilation devices.

3 Claims, 14 Drawing Sheets

(51) Int. Cl.
*F24F 3/14* (2006.01)
*F24F 3/147* (2006.01)
*F25B 13/00* (2006.01)

(52) U.S. Cl.
CPC .............. *F24F 7/06* (2013.01); *F24F 11/0001* (2013.01); *F24F 11/0012* (2013.01); *F24F 11/0015* (2013.01); *F24F 2011/0013* (2013.01); *F24F 2011/0016* (2013.01); *F24F 2011/0047* (2013.01); *F25B 13/00* (2013.01); *F25B 2313/0293* (2013.01); *F25B 2313/0294* (2013.01); *F25B 2313/02741* (2013.01); *F25B 2341/065* (2013.01); *F25B 2600/0253* (2013.01); *F25B 2700/1931* (2013.01); *F25B 2700/1933* (2013.01); *F25B 2700/21151* (2013.01); *F25B 2700/21152* (2013.01); *Y02B 30/72* (2013.01); *Y02B 30/741* (2013.01); *Y02B 30/746* (2013.01)

(56) References Cited

U.S. PATENT DOCUMENTS

| | | | | |
|---|---|---|---|---|
| 4,731,547 | A * | 3/1988 | Alenduff et al. | 307/85 |
| 5,170,673 | A * | 12/1992 | Ahmed et al. | 73/865.9 |
| 5,269,660 | A * | 12/1993 | Pradelle | 417/18 |
| 5,292,280 | A * | 3/1994 | Janu et al. | 454/229 |
| 5,385,031 | A * | 1/1995 | Kizawa et al. | 62/186 |
| 5,417,077 | A * | 5/1995 | Jeffery | F24F 11/0009 236/49.3 |
| 5,540,619 | A * | 7/1996 | Ahmed | 454/256 |
| 5,705,734 | A * | 1/1998 | Ahmed | 73/1.35 |
| 5,806,582 | A * | 9/1998 | Santavuori | F24F 11/0009 165/104.31 |
| 5,862,982 | A * | 1/1999 | Federspiel | 236/49.3 |
| 5,944,098 | A * | 8/1999 | Jackson | 165/217 |
| 6,134,511 | A | 10/2000 | Subbarao | 703/6 |
| 6,719,625 | B2 * | 4/2004 | Federspiel | 454/256 |
| 7,024,258 | B2 * | 4/2006 | Ahmed et al. | 700/86 |
| 7,566,262 | B2 * | 7/2009 | Hu | 454/329 |
| 7,641,546 | B2 * | 1/2010 | Bok | G05D 23/2028 353/52 |
| 7,797,084 | B2 * | 9/2010 | Miwa | 700/296 |
| 7,827,813 | B2 * | 11/2010 | Seem | 62/186 |
| 7,894,943 | B2 * | 2/2011 | Sloup | G05B 13/041 165/257 |
| 8,209,056 | B2 * | 6/2012 | Rasmussen et al. | 700/276 |
| 8,306,667 | B2 * | 11/2012 | Baba et al. | 700/276 |
| 8,352,083 | B2 * | 1/2013 | Ng | F24F 11/00 700/276 |
| 8,364,318 | B2 * | 1/2013 | Grabinger et al. | 700/276 |
| 8,423,192 | B2 * | 4/2013 | Liu | F24F 11/0076 236/49.3 |
| 8,442,694 | B2 * | 5/2013 | Jang | 700/276 |
| 8,825,217 | B2 * | 9/2014 | Borrett et al. | 700/295 |
| 8,900,042 | B2 * | 12/2014 | Meng | G05D 23/1912 318/471 |
| 9,046,898 | B2 * | 6/2015 | Mucignat | G05D 23/1905 |
| 2004/0239494 | A1 * | 12/2004 | Kennedy et al. | 340/500 |
| 2005/0066672 | A1 * | 3/2005 | Yamamoto | H05K 7/20209 62/186 |
| 2005/0125102 | A1 * | 6/2005 | Nichols et al. | 700/276 |
| 2005/0224069 | A1 * | 10/2005 | Patil et al. | 126/299 D |
| 2006/0009862 | A1 * | 1/2006 | Imhof et al. | 700/19 |
| 2007/0145158 | A1 * | 6/2007 | Dietz et al. | 236/1 B |
| 2008/0119126 | A1 * | 5/2008 | Shizuo et al. | 454/75 |
| 2009/0134823 | A1 | 5/2009 | Jeung | |
| 2010/0082162 | A1 * | 4/2010 | Mundy et al. | 700/277 |
| 2010/0105308 | A1 * | 4/2010 | Masse | 454/168 |
| 2010/0217550 | A1 * | 8/2010 | Crabtree et al. | 702/62 |
| 2011/0093424 | A1 * | 4/2011 | Zimmermann | G05B 17/02 706/47 |
| 2012/0041574 | A1 * | 2/2012 | Hsiung et al. | 700/47 |
| 2012/0041604 | A1 * | 2/2012 | Isaksson et al. | 700/277 |
| 2012/0122388 | A1 * | 5/2012 | Matsui | 454/251 |
| 2012/0217801 | A1 * | 8/2012 | Yamashita | 307/31 |
| 2012/0253521 | A1 * | 10/2012 | Storm et al. | 700/276 |
| 2012/0259469 | A1 * | 10/2012 | Ward et al. | 700/276 |
| 2012/0330465 | A1 * | 12/2012 | O'Neill et al. | 700/276 |
| 2013/0035794 | A1 * | 2/2013 | Imani | 700/276 |
| 2013/0037620 | A1 * | 2/2013 | Aryanfar | G06F 1/206 236/49.3 |
| 2013/0151019 | A1 * | 6/2013 | Federspiel | 700/276 |
| 2014/0074730 | A1 * | 3/2014 | Arensmeier et al. | 705/305 |
| 2014/0094105 | A1 * | 4/2014 | Lundh et al. | 454/168 |

FOREIGN PATENT DOCUMENTS

| | | |
|---|---|---|
| JP | 6-6465 U | 1/1994 |
| JP | 11-72262 A | 3/1999 |
| JP | 2005-24216 A | 1/2005 |
| JP | 2010-203736 A | 9/2010 |
| WO | WO-2011/004590 A1 * | 1/2011 ............. F24F 7/007 |

* cited by examiner

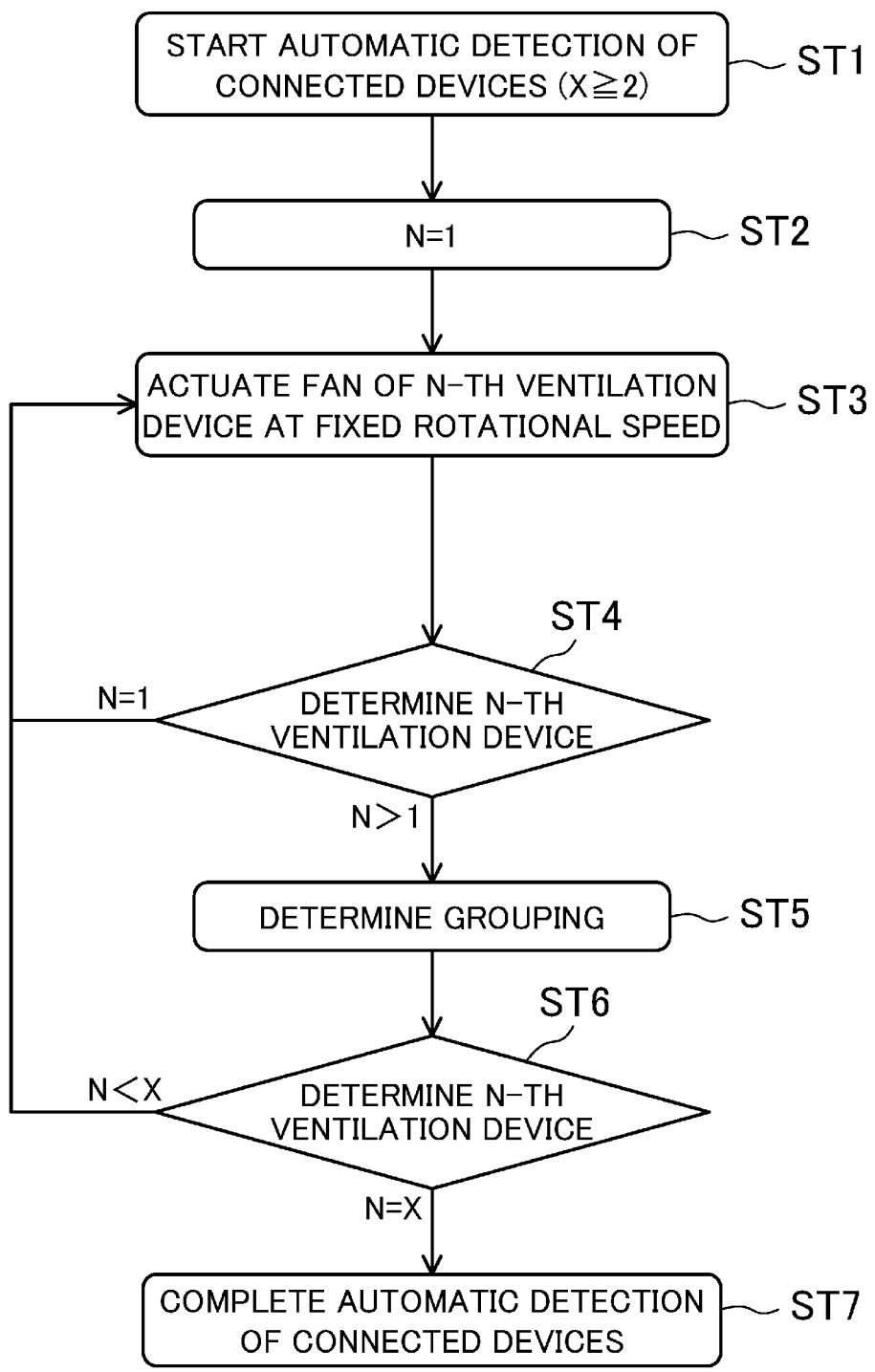

FIG.3

| | FIRST DETERMINATION | | SECOND DETERMINATION | | THIRD DETERMINATION | | FOURTH DETERMINATION | | FIFTH DETERMINATION | | SIXTH DETERMINATION | | → | N-TH DETERMINATION | | (N+1)-TH DETERMINATION | |
|---|---|---|---|---|---|---|---|---|---|---|---|---|---|---|---|---|---|
| | POWER FLUCTU- ATIONS | DUCT BANK NO. | POWER FLUCTU- ATIONS | DUCT BANK NO. | POWER FLUCTU- ATIONS | DUCT BANK NO. | POWER FLUCTU- ATIONS | DUCT BANK NO. | POWER FLUCTU- ATIONS | DUCT BANK NO. | POWER FLUCTU- ATIONS | DUCT BANK NO. | | POWER FLUCTU- ATIONS | DUCT BANK NO. | POWER FLUCTU- ATIONS | DUCT BANK NO. |
| FIRST VENTILATION DEVICE | ● | 1 | × | 1 | × | 1 | ○ | 1 | ○ | 1 | × | 1 | | × | 1 | ○ | 1 |
| SECOND VENTILATION DEVICE | – | – | ● | 2 | × | 2 | × | 2 | × | 2 | ○ | 2 | | ○ | 2 | × | 2 |
| THIRD VENTILATION DEVICE | – | – | – | – | ● | 3 | × | 3 | × | 3 | × | 3 | | × | 3 | × | 3 |
| FOURTH VENTILATION DEVICE | – | – | – | – | – | – | ● | 1 | ○ | 1 | × | 1 | | × | 1 | ○ | 1 |
| FIFTH VENTILATION DEVICE | – | – | – | – | – | – | – | – | ● | 1 | × | 1 | | × | 1 | ○ | 1 |
| SIXTH VENTILATION DEVICE | – | – | – | – | – | – | – | – | – | – | ● | 2 | | ○ | 2 | × | 2 |
| · | · | · | · | · | · | · | · | · | · | · | · | · | | · | · | · | · |
| · | · | · | · | · | · | · | · | · | · | · | · | · | | · | · | · | · |
| N-TH VENTILATION DEVICE | – | – | – | – | – | – | – | – | – | – | – | – | | ● | 2 | × | 2 |
| BOOSTER FAN | – | – | – | – | – | – | – | – | – | – | – | – | | – | – | ● | 1 |

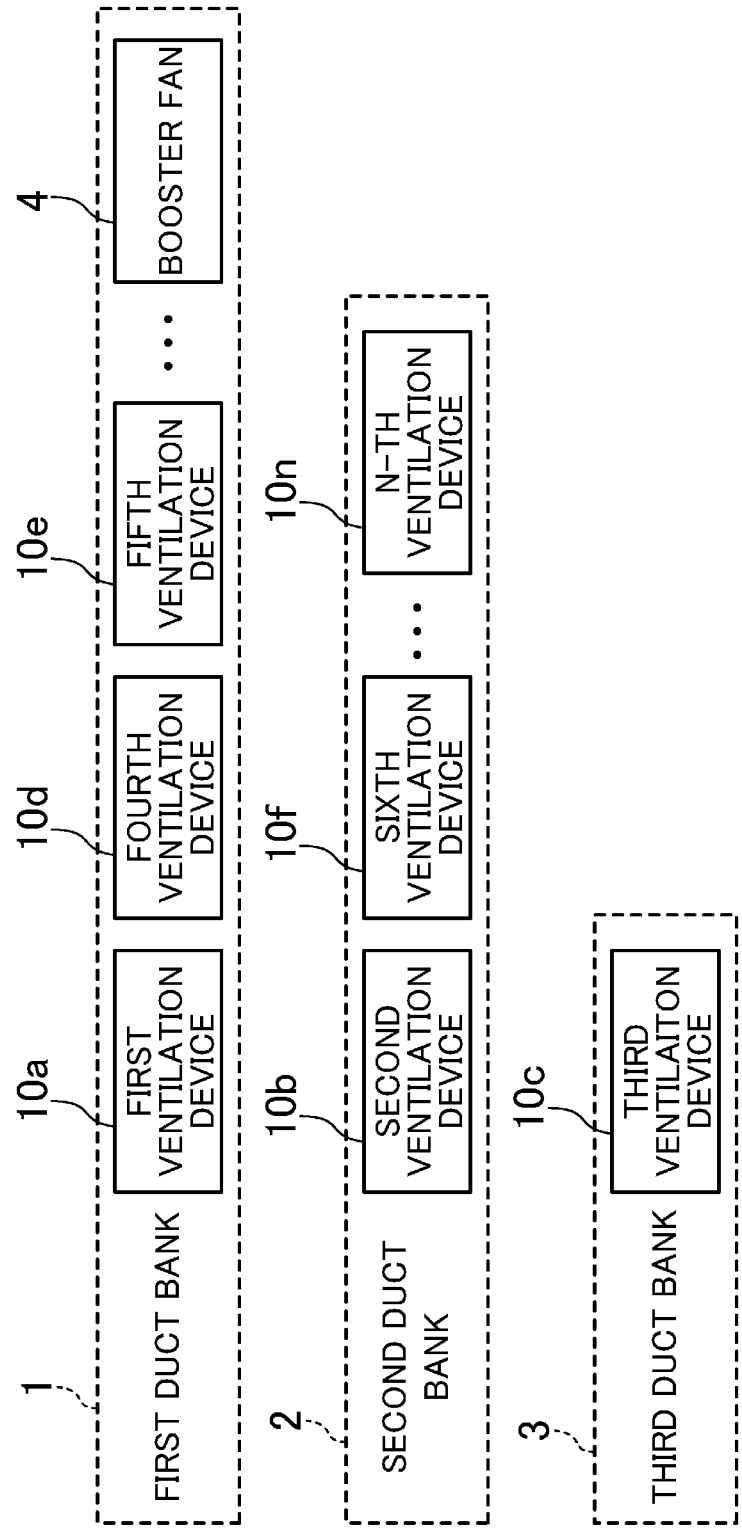

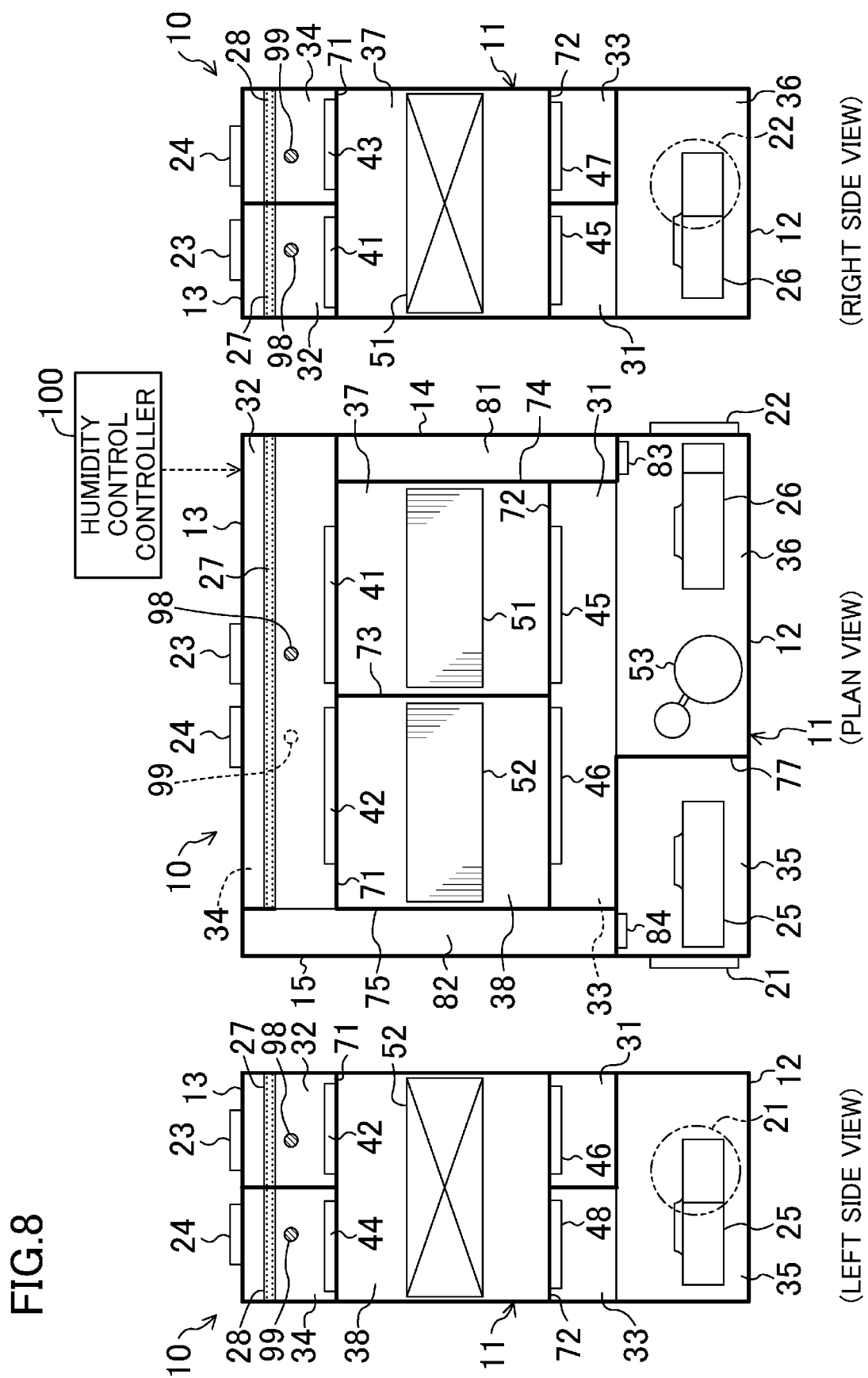

FIRST NORMAL OPERATION

SECOND NORMAL OPERATION

VENTILATION SYSTEM

TECHNICAL FIELD

The present invention relates to ventilation systems each including a plurality of ventilation devices connected to ducts.

BACKGROUND ART

As described in PATENT DOCUMENT 1, a ventilation system has been conventionally known which each include a plurality of connected devices connected to a common duct. The ventilation system uses a duct to which a plurality of connected devices are connected as a duct for introducing outside air, thereby simplifying the construction of the duct.

CITATION LIST

Patent Document

PATENT DOCUMENT 1: Japanese Utility Model Publication No. H06-6465

SUMMARY OF THE INVENTION

Technical Problem

Incidentally, known ventilation systems including ducts include a ventilation system using ventilation devices, such as air conditioners, humidity controlling ventilation devices, or blowers, as connected devices connected to the ducts. In such a ventilation system, the specifications of a duct need to be determined depending on the number of ventilation devices connected to the duct, and thus, in the introduction of the ventilation system, all of the ventilation devices connected to the duct are brought into operation to check whether or not the required ventilation flow rate is ensured.

However, the ventilation system cannot automatically determine the relationship of connection between many ventilation devices included in the ventilation system and a specific duct in adjustment of the flow rate, and the estimated number of ventilation devices connected to the duct may be different from the actual number of ventilation devices connected to the duct back.

In this case, for example, when the actual number of ventilation devices connected to the duct is greater than the estimated number of ventilation devices connected to the duct back, the ventilation flow rate during normal operation is higher than the estimated ventilation flow rate. This increases the loss of air pressure, and thus, the air flow rate of each of the ventilation devices becomes insufficient.

It is therefore an object of the present invention to provide a ventilation system including a plurality of ventilation devices and configured to automatically determine at least one of the ventilation devices belonging to a specific duct.

Solution to the Problem

In the present invention, a ventilation device belonging to a specific duct is automatically determined.

A ventilation system according to a first aspect of the invention includes: a plurality of ventilation devices (10a-10n) including at least one specific ventilation device (10a, 10b, 10c, . . . ) and a determination ventilation device (10n) that each include an air blowing fan (25, 26); ducts (1, 2, 3) to which the ventilation devices (10a-10n) are connected; a fan controller (5a) configured to control a rotational speed of the air blowing fan (25, 26) of each of the ventilation devices (10a-10n); a power detector (5b) configured to detect a fluctuation in power consumed by the air blowing fan (25, 26) of each of the ventilation devices (10a-10n); a connection determinator (5c) configured to determine that the determination ventilation device (10n) and the specific ventilation device (10a, 10b, 10c, . . . ) are connected to an identical one of the ducts (1, 2, 3) in a situation where when the fan controller (5a) drives the air blowing fan (25, 26) of the specific ventilation device (10a, 10b, 10c, . . . ) connected to a specific duct (1, 2, 3), and changes the rotational speed of the air blowing fan (25, 26) of the determination ventilation device (10n), the power detector (5b) detects a fluctuation in the power consumed by the air blowing fan (25, 26) of the specific ventilation device (10a, 10b, 10c, . . . ), and determine that the determination ventilation device (10n) and the specific ventilation device (10a, 10b, 10c, . . . ) are connected to different ones of the ducts (1, 2, 3) in a situation where when the fan controller (5a) drives the air blowing fan (25, 26) of the specific ventilation device (10a, 10b, 10c, . . . ) connected to a specific duct (1, 2, 3), and changes the rotational speed of the air blowing fan (25, 26) of the determination ventilation device (10n), the power detector (5b) does not detect a fluctuation in the power consumed by the air blowing fan (25, 26) of the specific ventilation device (10a, 10b, 10c, . . . ).

In the first aspect of the invention, the plurality of ventilation devices (10a-10n) each including the air blowing fan (25, 26) are connected to the ducts (1, 2, 3). The fan controller (5a) controls the rotational speed of the air blowing fan (25, 26) of each of the ventilation devices (10a-10n), and the power detector (5b) detects fluctuations in the power consumed by the air blowing fan (25, 26) of each of the ventilation devices (10a-10n).

The fan controller (5a) drives the air blowing fan (25, 26) of the specific ventilation device (10a, 10b, 10c, . . . ) connected to the single specific duct (1, 2, 3), and changes the rotational speed of the air blowing fan (25, 26) of the determination ventilation device (10n). In this case, the power detector (5b) detects fluctuations in the power consumed by the air blowing fan (25, 26) of the driven specific ventilation device (10a, 10b, 10c, . . . ).

When fluctuations in the power consumed by the air blowing fan (25, 26) of the specific ventilation device (10a, 10b, 10c, . . . ) are detected, this allows the connection determinator (5c) to determine that the determination ventilation device (10n) and the specific ventilation device (10a, 10b, 10c, . . . ) are connected to an identical one of the ducts (1, 2, 3), and when fluctuations in the power consumed by the air blowing fan (25, 26) of the specific ventilation device (10a, 10b, 10c, . . . ) are not detected, this allows the connection determinator (5c) to determine that the determination ventilation device (10n) and the specific ventilation device (10a, 10b, 10c, . . . ) are connected to different ones of the ducts (1, 2, 3).

A second aspect of the invention is directed to the ventilation system of the first aspect of the invention, and the connection determinator (5c) may be configured to determine that the determination ventilation device (10n) and the specific ventilation device (10a, 10b, 10c, . . . ) are connected to an identical one of the ducts (1, 2, 3) in a situation where when the rotational speed of the air blowing fan (25, 26) of the determination ventilation device (10n) is increased, the power consumed by the air blowing fan (25, 26) of the specific ventilation device (10a, 10b, 10c, . . . ) decreases.

In the second aspect of the invention, the connection determinator (5c) determines that the determination ventilation device (10n) and the specific ventilation device (10a, 10b, 10c, . . . ) are connected to an identical one of the ducts (1, 2, 3) in a situation where when the fan controller (5a) has increased the rotational speed of the air blowing fan (25, 26) of the determination ventilation device (10n), the power detector (5b) detects a decrease in the power consumed by the air blowing fan (25, 26) of the specific ventilation device (10a, 10b, 10c, . . . ).

On the other hand, the connection determinator (5c) determines that the determination ventilation device (10n) and the specific ventilation device (10a, 10b, 10c, . . . ) are connected to different ones of the ducts (1, 2, 3) in a situation where when the fan controller (5a) has increased the rotational speed of the air blowing fan (25, 26) of the determination ventilation device (10n), the power detector (5b) does not detect a decrease in the power consumed by the air blowing fan (25, 26) of the specific ventilation device (10a, 10b, 10c, . . . ).

A third aspect of the invention is directed to the ventilation system of the first aspect of the invention, and the connection determinator (5c) may be configured to determine that the determination ventilation device (10n) and the specific ventilation device (10a, 10b, 10c, . . . ) are connected to an identical one of the ducts (1, 2, 3) in a situation where when the rotational speed of the air blowing fan (25, 26) of the determination ventilation device (10n) is decreased, the power consumed by the air blowing fan (25, 26) of the specific ventilation device (10a, 10b, 10c, . . . ) increases.

In the third aspect of the invention, the connection determinator (5c) determines that the determination ventilation device (10n) and the specific ventilation device (10a, 10b, 10c, . . . ) are connected to an identical one of the ducts (1, 2, 3) in a situation where when the fan controller (5a) has decreased the rotational speed of the air blowing fan (25, 26) of the determination ventilation device (10n), the power detector (5b) detects an increase in the power consumed by the air blowing fan (25, 26) of the specific ventilation device (10a, 10b, 10c, . . . ).

On the other hand, the connection determinator (5c) determines that the determination ventilation device (10n) and the specific ventilation device (10a, 10b, 10c, . . . ) are connected to different ones of the ducts (1, 2, 3) in a situation where when the fan controller (5a) has decreased the rotational speed of the air blowing fan (25, 26) of the determination ventilation device (10n), the power detector (5b) does not detect an increase in the power consumed by the air blowing fan (25, 26) of the specific ventilation device (10a, 10b, 10c, . . . ).

Advantages of the Invention

According to the first aspect of the invention, when the power consumed by the air blowing fan (25, 26) of the specific ventilation device (10a, 10b, 10c, . . . ) varies by changing the rotational speed of the air blowing fan (25, 26) of the determination ventilation device (10n), this allows an automatic determination to be made that the determination ventilation device (10n) is connected to the duct (1, 2, 3) to which the specific ventilation device (10a, 10b, 10c, . . . ) is also connected. Therefore, the duct (1, 2, 3) to which the determination ventilation device (10n) is connected can be automatically determined. Consequently, the air flow rate of the ventilation system can be accurately adjusted.

According to the second aspect of the invention, when the rotational speed of the air blowing fan (25, 26) of the determination ventilation device (10n) is increased, and as a result, the power consumed by the air blowing fan (25, 26) of the specific ventilation device (10a, 10b, 10c, . . . ) decreases, this allows an automatic determination to be made that the determination ventilation device (10n) is connected to the duct (1, 2, 3) to which the specific ventilation device (10a, 10b, 10c, . . . ) is also connected. Therefore, the duct (1, 2, 3) to which the determination ventilation device (10n) is connected can be automatically determined. Consequently, the air flow rate of the ventilation system can be accurately adjusted.

According to the third aspect of the invention, when the rotational speed of the air blowing fan (25, 26) of the determination ventilation device (10n) is decreased, and as a result, the power consumed by the specific ventilation device (10a, 10b, 10c, . . . ) increases, this allows an automatic determination to be made that the determination ventilation device (10n) is connected to the duct (1, 2, 3) to which the specific ventilation device (10a, 10b, 10c, . . . ) is also connected. Therefore, the duct (1, 2, 3) to which the determination ventilation device (10n) is connected can be automatically determined. Consequently, the air flow rate of the ventilation system can be accurately adjusted.

BRIEF DESCRIPTION OF THE DRAWINGS

FIG. 2 is a flow chart illustrating a determination procedure.

FIG. 3 is a table illustrating a determination method.

FIG. 4 is a diagram illustrating the relationship of connection between ventilation devices and ducts.

FIG. 8 illustrates a schematic plan view, a right side view, and a left side view illustrating the humidity controlling ventilation device, omitting a part thereof.

FIG. 9(A) illustrates a first normal operation, and FIG. 9(B) illustrates a second normal operation.

DESCRIPTION OF EMBODIMENTS

Embodiments of the present invention will be described in detail hereinafter with reference to the drawings.

<Configuration of Ventilation System>

Figure 1:
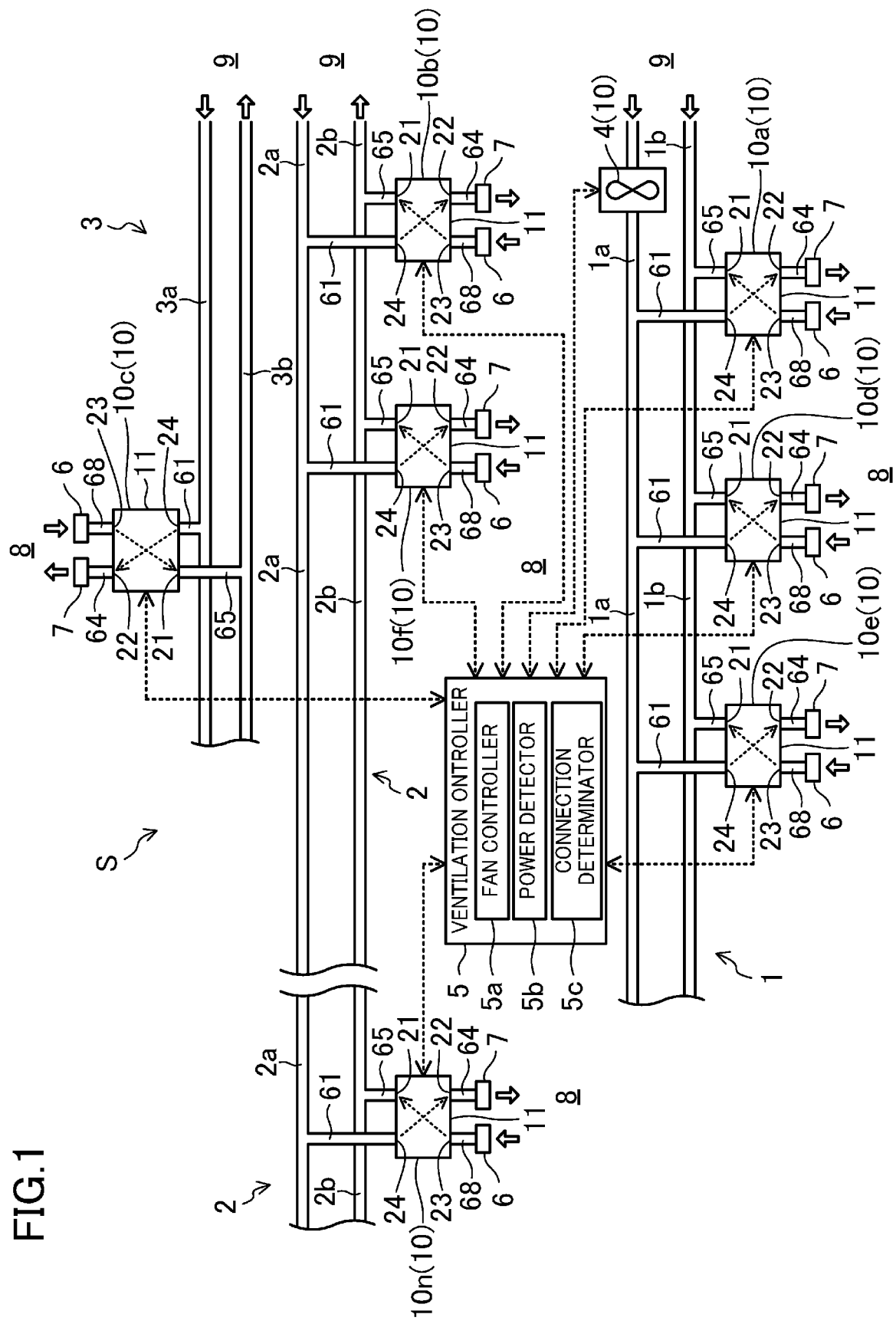
FIG. 1 is a diagram illustrating the configuration of a ventilation system.
Figure 5:
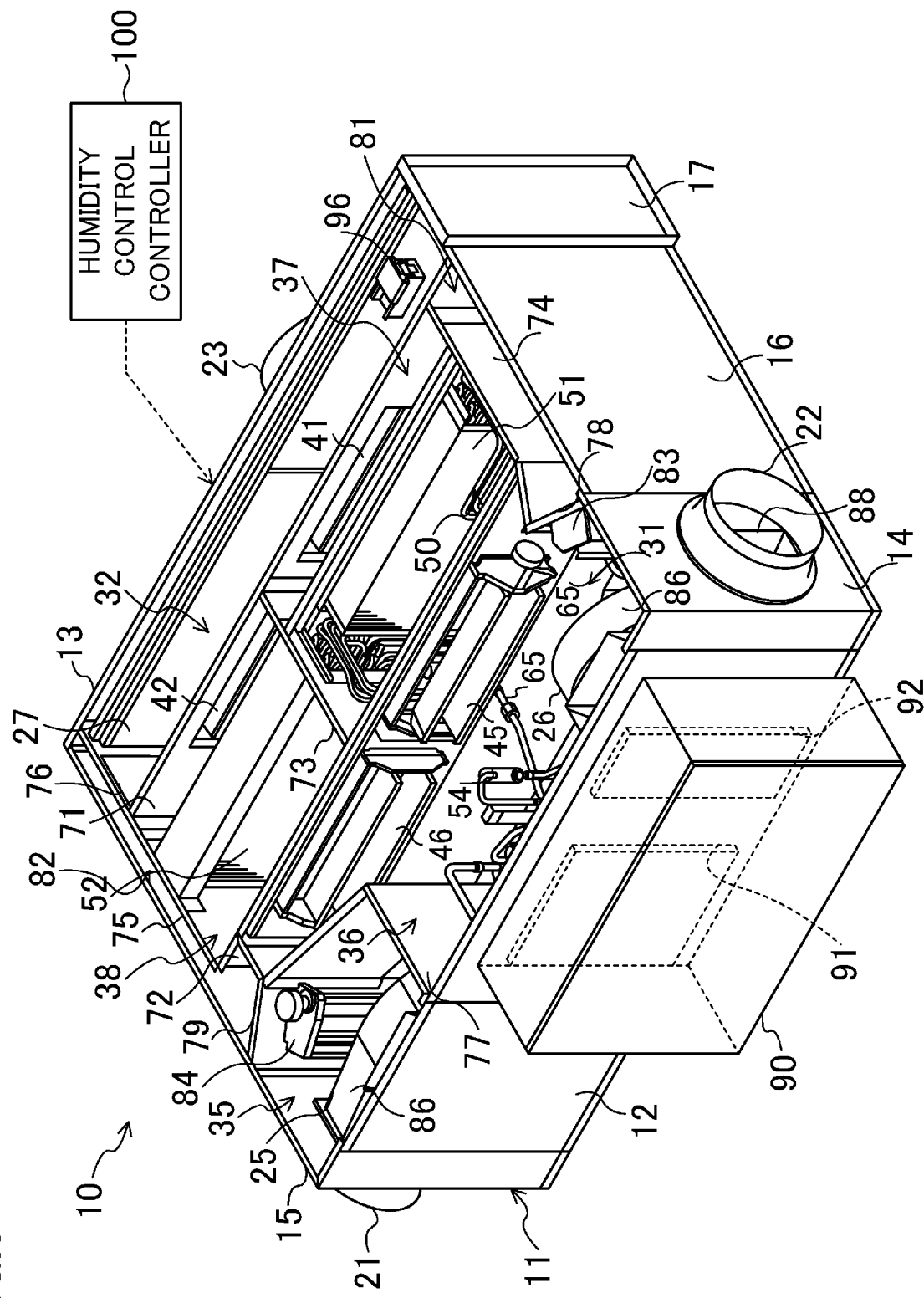
FIG. 5 is a perspective view illustrating a humidity controlling ventilation device as viewed from the front surface side, omitting a top plate of a casing.
Figure 6:
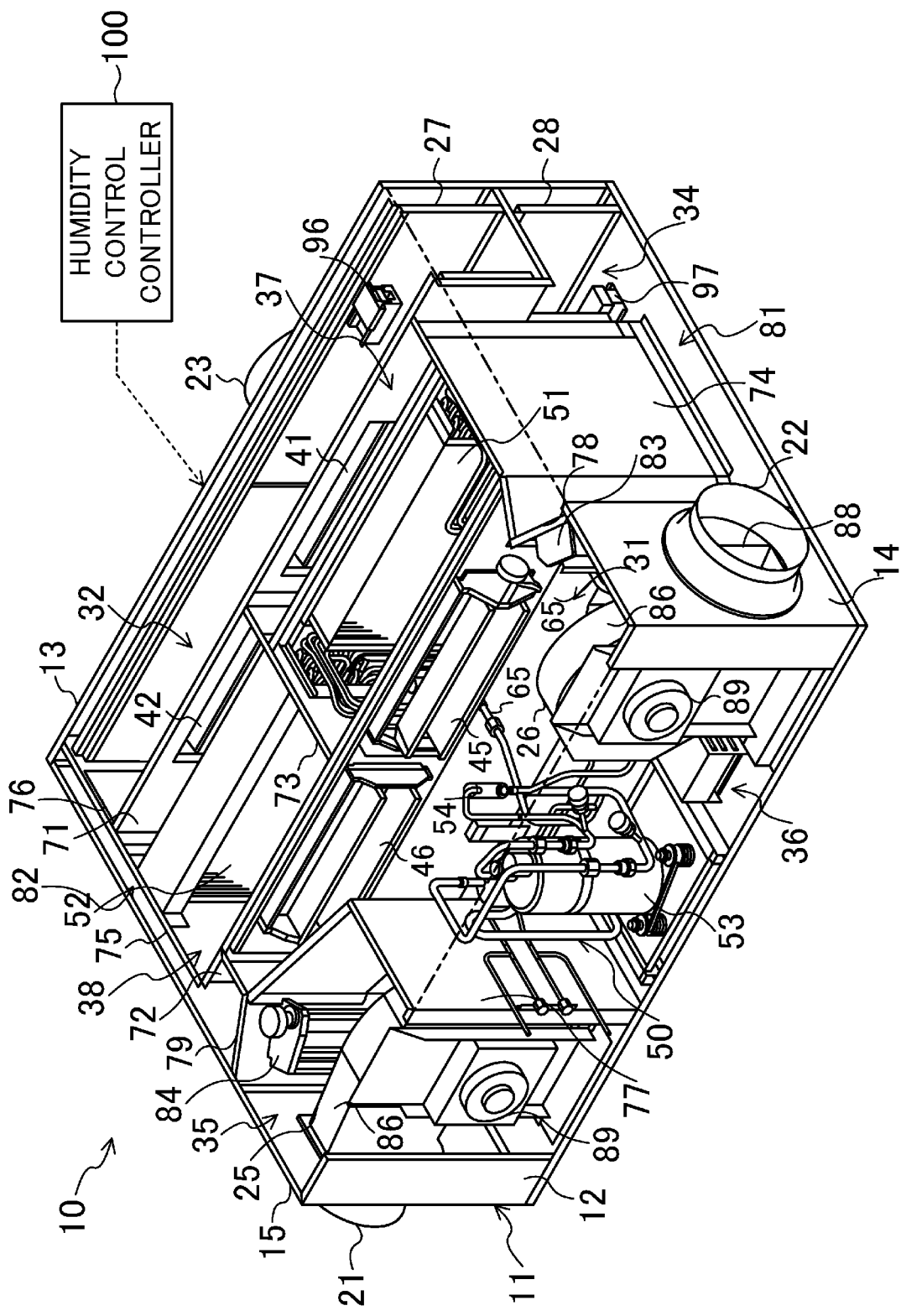
FIG. 6 is a perspective view illustrating the humidity controlling ventilation device as viewed from the front surface side, omitting a part of the casing and an electrical component box.
Figure 7:
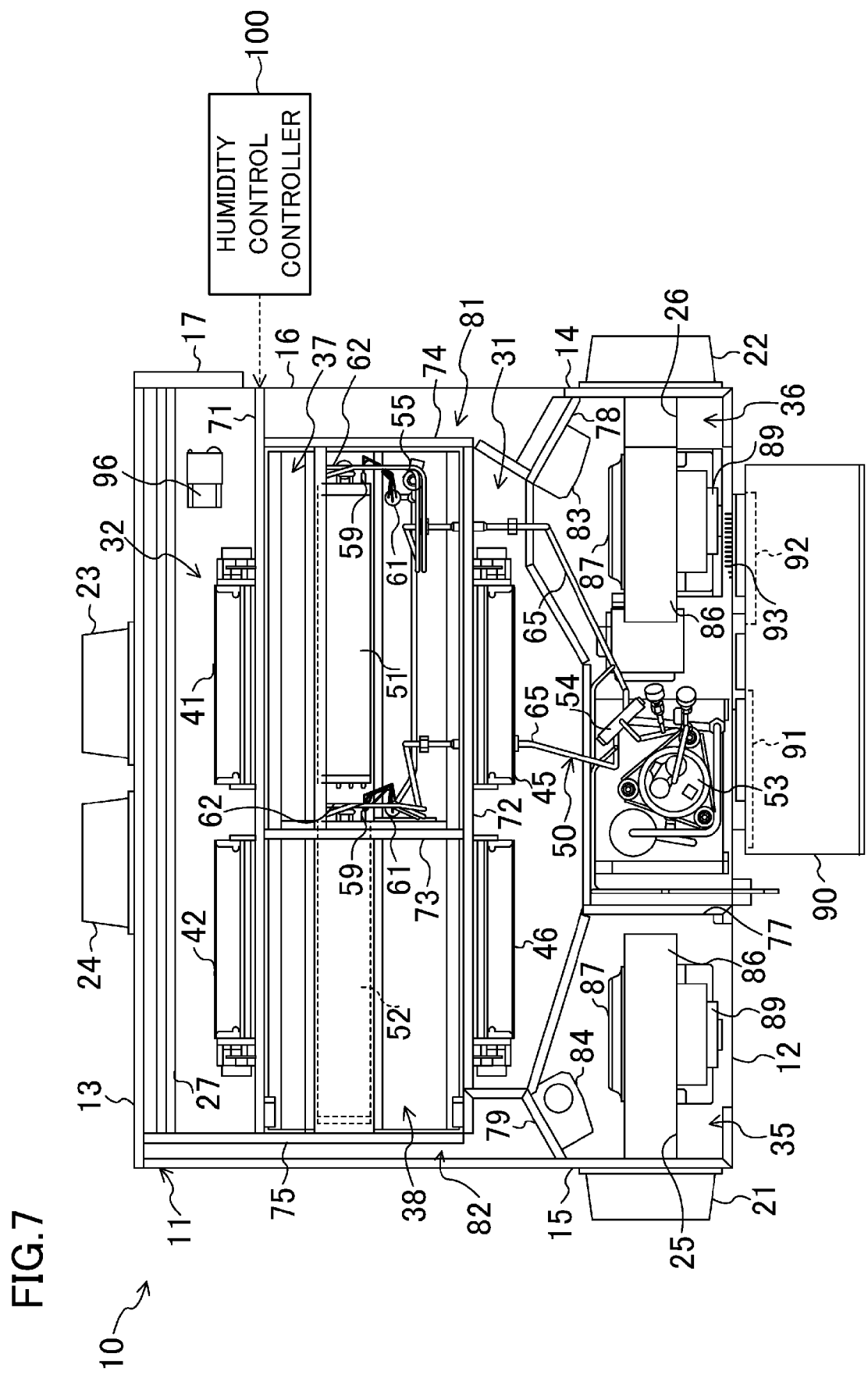
FIG. 7 is a plan view illustrating the humidity controlling ventilation device, omitting the top plate of the casing.

FIG. 1 illustrates a ventilation system (S) according to an embodiment of the present invention. The ventilation system (S) includes a plurality of ventilation devices (4, 10a, . . . ), and a ventilation controller (5). The ventilation devices (4, 10a, . . . ) include first through N-th humidity controlling ventilation devices (10a-10n), and a booster fan (4).

In the ventilation system (S), a plurality of humidity controlling ventilation devices (10a-10n) are connected to a plurality of common ducts (1-3) to connect an outside (9) and a room (8) together. Specifically, the ventilation system (S) includes a first duct bank (1), a second duct bank (2), and a third duct bank (3), and the duct banks (1, 2, 3) are each connected to at least one of the humidity controlling ventilation devices (10a-10n). The duct banks (1, 2, 3) each form a duct according to the present invention.

The first humidity controlling ventilation device (10a), the fourth humidity controlling ventilation device (10d), the fifth humidity controlling ventilation device (10e), and the booster fan (4) are connected to the first duct bank (1). The second humidity controlling ventilation device (10b) and the sixth humidity controlling ventilation device (10f) are connected to the second duct bank (2). The third humidity controlling ventilation device (10c) is connected to the third duct bank (3).

The duct banks (1, 2, 3) each include two ducts, i.e., an air-supply duct and an exhaust duct. Specifically, the first duct bank (1) includes a first air-supply duct (1a) and a first exhaust duct (1b). The second duct bank (2) includes a second air-supply duct (2a) and a second exhaust duct (2b). The third duct bank (3) includes a third air-supply duct (3a) and a third exhaust duct (3b).

Next, the first through N-th humidity controlling ventilation devices (10a-10n) that are humidity controlling ventilation devices forming the ventilation system (S), the booster fan (4), and the ventilation controller (5) will be described, and then, the humidity controlling ventilation devices (10) will be specifically described.

The first through N-th humidity controlling ventilation devices (10a-10n) have the same structure. Therefore, the first through N-th humidity controlling ventilation devices (10a-10n) are each formed as a humidity controlling ventilation device (10). The humidity controlling ventilation devices (10) form ventilation devices according to the present invention.

The humidity controlling ventilation devices (10) are configured to control the humidity of the room while also ventilating the room (8), control the humidity of the received outside air (OA) to supply the humidity-controlled air into the room (8) while simultaneously discharging the received room air (RA) to the outside (9). The humidity controlling ventilation devices (10) each include a casing (11). The casing (11) has an outside-air inlet (24) through which outside air (OA) is introduced, an air supply opening (22) through which humidity-controlled air (SA) is supplied into the room (8), a room-air inlet (23) through which room air (RA) is introduced, and an exhaust opening (21) through which the room air is discharged, as exhaust air (EA), to an outside. A supply air passage is formed between the outside-air inlet (24) and the air supply opening (22), and an exhaust air passage is formed between the room-air inlet (23) and the exhaust opening (21). The casing (11) includes heat exchangers (51, 52) configured to exchange heat between supply air passing through the supply air passage and exhaust air passing through the exhaust air passage. The casing (11) includes the supply air passage and the exhaust air passage that are formed to cross each other in the heat exchangers (51, 52).

The supply air passage includes an air supply fan (26). The air supply fan (26) is composed of a DC fan (i.e., a fan using a DC motor as a drive source). The air supply fan (26) forms an air blowing fan according to the present invention. An outside-air inlet (24) at the upstream end in supply air of the air supply passage (i.e., toward the outside) communicates with an outside air-supply duct (61). The outside air-supply duct (61) communicates with an air-supply duct (1a, 2a, 3a) at its upstream end in supply air. The air-supply duct (1a, 2a, 3a) communicates with the outside (9) at a ventilation opening in the upstream end in supply air of the air-supply duct (1a, 2a, 3a). The air supply opening (22) at the downstream end in supply air (i.e., toward the room) of the air supply passage communicates with a room air-supply duct (64). The room air-supply duct (64) is connected through an air supply grille (7) into the room. In other words, outside air is introduced through the ventilation opening into the air-supply duct (1a, 2a, 3a), is introduced through the outside air-supply duct (61) into the supply air passage of each of the humidity controlling ventilation devices (10a-10n), and then, is introduced through the room air-supply duct (64) and the air supply grille (7) into the room (8).

The exhaust air passage includes an exhaust fan (25). The exhaust fan (25) is composed of a DC fan. The exhaust fan (25) forms an air blowing fan according to the present invention. An exhaust opening (21) at the downstream end in exhaust air (i.e., toward the outside) of the exhaust air passage communicates with an outside exhaust duct (65). The outside exhaust duct (65) communicates with an exhaust duct (1b, 2b, 3b) at its downstream end in exhaust air. The exhaust duct (1b, 2b, 3b) communicates with the outside (9) through a ventilation opening at the downstream end in exhaust air (i.e., toward the outside) of the exhaust duct (1b, 2b, 3b). A room-air inlet (23) at the upstream end in exhaust air (i.e., toward the room) of the exhaust air passage communicates with a room-side exhaust duct (68). The room-side exhaust duct (68) is connected through an air exhaust grille (6) into the room (8). In other words, room air is introduced through the air exhaust grille (6) and the room-side exhaust duct (68) into the exhaust air passage of each of the humidity controlling ventilation devices (10a-10n), is then introduced through the outside exhaust duct (65) into the exhaust duct (1b, 2b, 3b), and is discharged through the ventilation opening to the outside (9).

The booster fan (4) is an auxiliary fan for assisting air supply by the air supply fan (26), and forms a ventilation device according to the present invention. The booster fan (4) is composed of a DC fan, and is provided upstream in air of the first air-supply duct (1a). Actuation of the booster fan (4) is controlled by the ventilation controller (5).

The ventilation controller (5) automatically groups all of the humidity controlling ventilation devices (10a-10n) and booster fan (4) of the ventilation system (S) based on the duct banks (1, 2, 3) to which the devices and fan are connected. The ventilation controller (5) includes a fan controller (5a), a power detector (5b), and a connection determinator (5c).

The fan controller (5a) is configured to control the fans (25, 26) of the humidity controlling ventilation devices (10a-10n) and the booster fan (4). Specifically, the fan controller (5a) controls actuation of fan motors of the fans (4, 25, 26) individually, and drives the fans (4, 25, 26) while maintaining the rotational speeds of the fans (4, 25, 26) at a predetermined rotational speed. In other words, the fan controller (5a) can drive an optional fan at a fixed rotational speed. The predetermined rotational speed is not limited to the rotational speed during normal operation.

The power detector (5b) is configured to detect the power consumed during operation of each of the fans (25, 26) of the humidity controlling ventilation devices (10a-10n) and the booster fan (4). Specifically, the power detector (5b) is connected to fan motors of the air supply fans (26) and exhaust fans (25) of the humidity controlling ventilation devices (10a-10n) to detect the power consumed by the fans (25, 26). Furthermore, the power detector (5b) is connected to a fan motor of the booster fan (4) to detect the power consumed by the fan (4).

The connection determinator (5c) is configured to determine the duct banks (1, 2, 3) to which the humidity controlling ventilation devices (10a-10n) and the booster fan (4) belong. Fluctuations in the consumed power of each of the humidity controlling ventilation devices (10a-10n) and the booster fan (4), which are detected by the power detector (5b), are fed to the connection determinator (5c). The connection determinator (5c) actuates the plurality of humidity controlling ventilation devices (10a-10n) and the booster fan (4) one after another, and determines the duct bank (1, 2, 3) to which the target humidity controlling ventilation device (e.g., the N-th humidity controlling ventilation device (10n)) or the booster fan (4) belongs, based on fluctuations in the power consumed by the other humidity controlling ventilation devices (10a, . . . ) immediately after the actuation of one of the devices and the fan.

—Determination Procedure—

Next, a procedure for grouping the humidity controlling ventilation devices (10a-10n) of the ventilation system (S) based on the duct banks (1, 2, 3) to which the devices (10a-10n) are connected will be described based on FIG. 2. In this embodiment, only connection of the humidity controlling ventilation devices (10a-10n) to the corresponding air-supply ducts (1a, 2a, 3a) will be described. Since the exhaust ducts (1b, 2b, 3b) are similar to the air-supply ducts (1a, 2a, 3a), the explanation of the exhaust ducts (1b, 2b, 3b) is omitted. The ventilation system (S) includes the ventilation controller (5) to which the humidity controlling ventilation devices (10a-10n) being N connected devices and the single booster fan (4) are connected. The determination procedure will be described assuming that in this determination procedure, the total number of connected devices connected to the ventilation system (S) is X (X=N+1, X≥2).

First, the ventilation controller (5) automatically detects the plurality of humidity controlling ventilation devices (10a-10n) and the booster fan (4) connected to the ventilation controller (5) (step ST1). Therefore, the total number X of the connected devices is N+1.

Next, the fan controller (5a) selects the first humidity controlling ventilation device (10a) that is the first connected device (N=1) (step ST2), and drives the air supply fan (26) of the first humidity controlling ventilation device (10a) at a predetermined rotational speed (step ST3).

Then, the first humidity controlling ventilation device (10a) is determined to be the first connected device (N=1) (step ST4), and this process proceeds to step ST3.

As illustrated in FIG. 3, the connection determinator (5c) determines that the duct bank to which the first humidity controlling ventilation device (10a) being the first connected device is connected is the first duct bank (1).

Next, while the power detector (5b) detects the power consumed by the air supply fan (26) of the first humidity controlling ventilation device (10a), the fan controller (5a) drives the air supply fan (26) of the second humidity controlling ventilation device (10b) that is the second connected device (N=2) after a fixed time interval while maintaining the rotational speed of the air supply fan (26) of the first humidity controlling ventilation device (10a) at a fixed speed (step ST3). In this case, the first humidity controlling ventilation device (10a) forms a specific ventilation device according to the present invention, the second humidity controlling ventilation device (10b) forms a determination ventilation device according to the present invention, and the first air-supply duct (1a) forms a specific duct according to the present invention.

Then, since the second humidity controlling ventilation device (10b) is the second connected device (N=2), the number N is determined to be greater than 1 (step ST4), and this process proceeds to step ST5.

In this case, as illustrated in FIG. 3, the power detector (5b) detects that the consumed power does not fluctuate, and thus, the connection determinator (5c) determines that the duct bank to which the second humidity controlling ventilation device (10b) is connected is the second duct bank (2) (step ST5).

Then, since the second humidity controlling ventilation device (10b) is the second connected device (N=2), the number X is determined to be greater than 2 (step ST6), and this process proceeds to step ST3.

Next, the power detector (5b) continues detecting the power consumed by the air supply fan (26) of each of the first and second humidity controlling ventilation devices (10a) and (10b), and the fan controller (5a) drives the air supply fan (26) of the third humidity controlling ventilation device (10c) that is the third connected device (N=3) after a fixed time interval while maintaining the rotational speeds of the air supply fans (26, 26) of the first and second humidity controlling ventilation devices (10a) and (10b) at a predetermined rotational speed (step ST3). In this case, the first and second humidity controlling ventilation devices (10a) and (10b) form specific ventilation devices according to the present invention, and the third humidity controlling ventilation device (10c) forms a determination ventilation device according to the present invention.

Then, since the third humidity controlling ventilation device (10c) is the third connected device (N=3), the number N is determined to be greater than 1 (step ST4), and this process proceeds to step ST5.

In this case, as illustrated in FIG. 3, the power detector (5b) detects that the consumed power does not fluctuate, and thus, the connection determinator (5c) determines that the duct bank to which the third humidity controlling ventilation device (10c) is connected is the third duct bank (3) (step ST5).

Then, since the third humidity controlling ventilation device (10c) is the third connected device (N=3), the number X is determined to be greater than 3 (step ST6), and this process proceeds to step ST3.

Next, the power detector (5b) continues detecting the power consumed by the air supply fan (26) of each of the first through third humidity controlling ventilation devices (10a-10c), and the fan controller (5a) drives the air supply fan (26) of the fourth humidity controlling ventilation device (10d) that is the fourth connected device (N=4) after a fixed time interval while maintaining the rotational speeds of the air supply fans (26, 26, 26) of the first through third humidity controlling ventilation devices (10a-10c) at a predetermined rotational speed (step ST3). In this case, the first through third humidity controlling ventilation devices (10a-10c) form specific ventilation devices according to the present invention, the fourth humidity controlling ventilation device (10d) forms a determination ventilation device according to the present invention, and the first air-supply duct (1a) forms a specific duct according to the present invention.

Then, since the fourth humidity controlling ventilation device (10d) is the fourth connected device (N=4), the number N is determined to be greater than 1 (step ST4), and this process proceeds to step ST5.

In this case, the power detector (5b) detects that the actuation of the air supply fan (26) of the fourth humidity controlling ventilation device (10d) decreases the power consumed by the air supply fan (26) of the first humidity controlling ventilation device (10a). The connection determinator (5c) determines, based on the fact that the actuation of the air supply fan (26) of the fourth humidity controlling ventilation device (10d) decreases the power consumed by the air supply fan (26) of the first humidity controlling ventilation device (10a), that the duct to which the fourth humidity controlling ventilation device (10d) is connected is the first air-supply duct (1a) to which the first humidity controlling ventilation device (10a) is also connected (step ST5).

Then, since the fourth humidity controlling ventilation device (10d) is the fourth connected device (N=4), the number X is determined to be greater than 4 (step ST6), and this process proceeds to step ST3.

Next, the power detector (5b) continues detecting the power consumed by the air supply fan (26) of each of the first through fourth humidity controlling ventilation devices (10a-10d), and the fan controller (5a) drives the air supply fan (26) of the fifth humidity controlling ventilation device (10e) that is the fifth connected device after a fixed time interval while maintaining the rotational speeds of the air supply fans (26, 26, 26, 26) of the first through fourth humidity controlling ventilation devices (10a-10d) at a predetermined rotational speed (step ST3). In this case, the first through fourth humidity controlling ventilation devices (10a-10d) form specific ventilation devices according to the present invention, the fifth humidity controlling ventilation device (10e) forms a determination ventilation device according to the present invention, and the first air-supply duct (1a) forms a specific duct according to the present invention.

Then, since the fifth humidity controlling ventilation device (10e) is the fifth connected device (N=5), the number N is determined to be greater than 1 (step ST4), and this process proceeds to step ST5.

In this case, the power detector (5b) detects that the actuation of the air supply fan (26) of the fifth humidity controlling ventilation device (10e) decreases the power consumed by the air supply fan (26) of each of the first and fourth humidity controlling ventilation devices (10a) and (10d). The connection determinator (5c) determines, based on the fact that the actuation of the air supply fan (26) of the fifth humidity controlling ventilation device (10e) decreases the power consumed by the air supply fan (26) of each of the first and fourth humidity controlling ventilation devices (10a) and (10d), that the duct to which the fifth humidity controlling ventilation device (10e) is connected is the first air-supply duct (1a) to which the first and fourth humidity controlling ventilation devices (10a) and (10d) are also connected (step ST5).

Then, since the fifth humidity controlling ventilation device (10e) is the fifth connected device (N=5), the number X is determined to be greater than 5 (step ST6), and this process proceeds to step ST3.

Next, the power detector (5b) continues detecting the power consumed by the air supply fan (26) of each of the first through fifth humidity controlling ventilation devices (10a-10e), and the fan controller (5a) drives the air supply fan (26) of the sixth humidity controlling ventilation device (10f) that is the sixth connected device after a fixed time interval while maintaining the rotational speeds of the air supply fans (26, 26, 26, 26, 26) of the first through fifth humidity controlling ventilation devices (10a-10e) at a predetermined rotational speed (step ST3). In this case, the first through fifth humidity controlling ventilation devices (10a-10e) form specific ventilation devices according to the present invention, the sixth humidity controlling ventilation device (10f) forms a determination, ventilation device according to the present invention, and the second air-supply duct (2a) forms a specific duct according to the present invention.

Then, since the sixth humidity controlling ventilation device (10f) is the sixth connected device (N=6), the number N is determined to be greater than 0.1 (step ST4), and this process proceeds to step ST5.

In this case, the power detector (5b) detects that the actuation of the air supply fan (26) of the sixth humidity controlling ventilation device (10f) decreases the power consumed by the air supply fan (26) of the second humidity controlling ventilation device (10b). The connection determinator (5c) determines, based on the fact that the actuation of the air supply fan (26) of the sixth humidity controlling ventilation device (10f) decreases the power consumed by the air supply fan (26) of the second humidity controlling ventilation device (10b), that the duct to which the sixth humidity controlling ventilation device (10f) is connected is the second air-supply duct (2a) to which the second humidity controlling ventilation device (10b) is also connected (step ST5).

As such, the humidity controlling ventilation devices (10a-10n) can be grouped based on the duct banks (1, 2, 3) to which the humidity controlling ventilation devices (10a-10n) are connected by performing the determination procedure in sequential order (see FIG. 4).

Next, the N-th humidity controlling ventilation device (10n) that is the N-th ventilation device will be described.

For the N-th humidity controlling ventilation device (10n), the power detector (5b) continues detecting the power consumed by the air supply fan (26) of each of the first through (N−1)-th humidity controlling ventilation devices (10a-10n−1), and the fan controller (5a) drives the air supply fan (26) of the N-th humidity controlling ventilation device (10n) that is the N-th connected device after a fixed time interval while maintaining the rotational speeds of the air supply fans (26-26) of the first through (N−1)-th humidity controlling ventilation devices (10a-10n−1) at a predetermined rotational speed (step ST3). In this case, the first through (N−1)-th humidity controlling ventilation devices (10a-10n−1) form specific ventilation devices according to the present invention, the N-th humidity controlling ventilation device (10n) forms a determination ventilation device according to the present invention, and the second air-supply duct (2a) forms a specific duct according to the present invention.

Then, since the N-th humidity controlling ventilation device (10n) is the N-th connected device (N=N), the number N is determined to be greater than 1 (step ST4), and this process proceeds to step ST5.

In this case, the power detector (5b) detects that the actuation of the air supply fan (26) of the N-th humidity controlling ventilation device (10n) decreases the power consumed by the air supply fan (26) of each of the second humidity controlling ventilation device (10b), the sixth humidity controlling ventilation device (10f), . . . . The connection determinator (5c) determines, based on the fact that the actuation of the air supply fan (26) of the N-th humidity controlling ventilation device (10n) decreases the power consumed by the air supply fan (26) of each of the second humidity controlling ventilation device (10b), the sixth humidity controlling ventilation device (10f), . . . , that the duct to which the N-th humidity controlling ventilation device (10n) is connected is the second air-supply duct (2a) to which the second humidity controlling ventilation device (10*b*), the sixth humidity controlling ventilation device (10*f*), . . . are also connected (step ST5).

Then, since the N-th humidity controlling ventilation device (10*n*) is the N-th connected device (N=N), the number X is determined to be greater than N (X=N+1) (step ST6), and this process proceeds to step ST3.

Next, the power detector (5*b*) continues detecting the power consumed by the air supply fan (26) of each of the first through N-th humidity controlling ventilation devices (10*a*-10*n*), and the fan controller (5*a*) drives the booster fan (4) that is the (N+1)-th connected device after a fixed time interval while maintaining the rotational speeds of the air supply fans (26-26) of the first through N-th humidity controlling ventilation devices (10*a*-10*n*) at a predetermined rotational speed (step ST3). In this case, the first through N-th humidity controlling ventilation devices (10*a*-10*n*) form specific ventilation devices according to the present invention, the booster fan (4) forms a determination ventilation device according to the present invention, and the first air-supply duct (1*a*) forms a specific duct according to the present invention.

Then, since the booster fan (4) is the (N+1)-th connected device (N=N+1), the number N is determined to be greater than 1 (step ST4), and this process proceeds to step ST5.

In this case, the power detector (5*b*) detects that the actuation of the booster fan (4) decreases the power consumed by the air supply fan (26) of each of the first humidity controlling ventilation device (10*a*), the fourth humidity controlling ventilation device (10*d*), the fifth humidity controlling ventilation device (10*e*), . . . . The connection determinator (5*c*) determines, based on the fact that the actuation of the booster fan (4) decreases the power consumed by the air supply fan (26) of each of the first humidity controlling ventilation device (10*a*), the fourth humidity controlling ventilation device (10*d*), the fifth humidity controlling ventilation device (10*e*), . . . , that the duct to which the booster fan (4) is connected is the first air-supply duct (1*a*) to which the first humidity controlling ventilation device (10*a*), the fourth humidity controlling ventilation device (10*d*), the fifth humidity controlling ventilation device (10*e*), . . . are also connected (step ST5).

Then, since the booster fan (4) is the (N+1)-th connected device (N=N+1), the number X is determined to be equal to N+1 (X=N+1) (step ST6), and the automatic detection of the connected devices is completed (step ST7).

<Specific Configuration of Humidity Controlling Ventilation Device>

The humidity controlling ventilation device (10) will be described with reference to FIGS. 5-8 as necessary. Note that the terms "upper," "lower," "left," "right," "front," "rear," "near" and "far" as used herein refer to the corresponding directions as the humidity controlling ventilation device (10) is viewed from the front surface side.

The humidity controlling ventilation device (10) includes a casing (11). A refrigerant circuit (50) is accommodated in the casing (11). A first adsorption heat exchanger (51), a second adsorption heat exchanger (52), a compressor (53), a four-way switching valve (54), and an electric expansion valve (55) are connected to the refrigerant circuit (50). The details of the refrigerant circuit (50) will be described below.

The casing (11) is formed in a rectangular parallelepiped shape that is slightly flattened and has a relatively low height. A portion of the casing (11) forming the near left side surface in FIG. 6 (i.e., the front surface) is a front surface panel portion (12), and a portion thereof forming the far right side surface in the figure (i.e., the rear surface) is a rear surface panel portion (13). A portion of the casing (11) forming the near right side surface in the figure is a first side surface panel portion (14), and a portion thereof forming the far left side surface in the figure is a second side surface panel portion (15).

The casing (11) is provided with an outside-air inlet (24), a room-air inlet (23), an air supply opening (22), and an exhaust opening (21).

The outside-air inlet (24) and the room-air inlet (23) are opened in the rear surface panel portion (13). The outside-air inlet (24) is placed in a lower portion of the rear surface panel portion (13). The room-air inlet (23) is placed in an upper portion of the rear surface panel portion (13). The air supply opening (22) is placed near an end portion of the first side surface panel portion (14) toward the front surface panel portion (12). The exhaust opening (21) is placed near an end portion of the second side surface panel portion (15) toward the front surface panel portion (12).

In the internal space of the casing (11), an upstream-side partition (71), a downstream-side partition (72), a center partition (73), a first partition (74), and a second partition (75) are provided. These partitions (71-75) are each provided upright on a bottom plate of the casing (11) to partition the internal space of the casing (11) from the bottom plate to a top plate of the casing (11).

The upstream-side partition (71) and the downstream-side partition (72) are placed in an orientation parallel to the front surface panel portion (12) and the rear surface panel portion (13), and are spaced a predetermined distance apart from each other in a front-rear direction of the casing (11). The upstream-side partition (71) is placed closer to the rear surface panel portion (13), and the downstream-side partition (72) is placed closer to the front surface panel portion (12).

The first and second partitions (74) and (75) are placed in an orientation parallel to the first and second side surface panel portions (14) and (15). The first partition (74) is placed a predetermined distance apart from the first side surface panel portion (14) to cover the space between the upstream-side partition (71) and the downstream-side partition (72) from the right side. The second partition (75) is placed a predetermined distance apart from the second side surface panel portion (15) to cover the space between the upstream-side partition (71) and the downstream-side partition (72) from the left side.

The center partition (73) is placed between the upstream-side partition (71) and the downstream-side partition (72) in an orientation perpendicular to the upstream-side partition (71) and the downstream-side partition (72). The center partition (73) extends from the upstream-side partition (71) to the downstream-side partition (72) to partition the space between the upstream-side partition (71) and the downstream-side partition (72) into left and right portions.

In the casing (11), the space between the upstream-side partition (71) and the rear surface panel portion (13) is partitioned into two, upper and lower, spaces. Of the upper and lower partitioned spaces, the upper space forms a room air-side passageway (32), and the lower space forms an outside air-side passageway (34). The room air-side passageway (32) communicates with the room (8) via the room-side exhaust duct (68) connected to the room-air inlet (23). The room air-side passageway (32) is provided with a room air-side filter (27), a room air humidity sensor (96), and a room air temperature sensor (98). The room air temperature sensor (98) and the room air humidity sensor (96) are configured to measure the temperature and humidity, respectively, of the air (RA) located in the upstream direction (on the primary side) of the adsorption heat exchangers (51, 52) and sucked from the room. The outside air-side passageway (34) communicates with the outside (9) via the outside air-supply duct (61) connected to the outside-air inlet (24). The outside air-side passageway (34) is provided with an outside air-side filter (28), an outside air humidity sensor (97), and an outside air temperature sensor (99). The outside air temperature sensor (99) and the outside air humidity sensor (97) are configured to measure the temperature and humidity, respectively of the air (OA) located in the upstream direction (on the primary side) of the adsorption heat exchangers (51, 52) and sucked from the outside. The room air temperature sensor (98) and the outside air temperature sensor (99) are not shown, but shown in FIG. 8. The room air humidity sensor (96) detects the relative humidity of the room air, and the outside air humidity sensor (97) detects the relative humidity of the outside air.

The space in the casing (11) between the upstream-side partition (71) and the downstream-side partition (72) is partitioned by the center partition (73) into left and right portions. The space on the right side of the center partition (73) forms a first heat exchanger chamber (37), and the space on the left side of the center partition (73) forms a second heat exchanger chamber (38). The first adsorption heat exchanger (51) is accommodated in the first heat exchanger chamber (37). The second adsorption heat exchanger (52) is accommodated in the second heat exchanger chamber (38). Although not shown, the electric expansion valve (55) of the refrigerant circuit (50) is accommodated in the first heat exchanger chamber (37).

The adsorption heat exchangers (51, 52) are adsorption members for bringing an adsorbent in contact with the air. The adsorption heat exchangers (51, 52) are so-called cross-fin-type fin-and-tube heat exchangers on the surface of which the adsorbent is carried, and each of the adsorption heat exchangers (51, 52) as a whole is formed in a rectangular thick plate shape or a flattened rectangular parallelepiped shape. The adsorption heat exchangers (51, 52) are provided upright in the corresponding heat exchanger chambers (37, 38) in an orientation such that their front and rear surfaces are parallel to the upstream-side partition (71) and the downstream-side partition (72). For example, zeolite, silica gel, or their mixture is used as the adsorbent carried on the adsorption heat exchangers (51, 52).

A portion of the internal space of the casing (11) along the front surface of the downstream-side partition (72) is partitioned into upper and lower portions. Of the upper and lower partitioned spaces, the upper space forms an air-supply-side passageway (31), and the lower space forms an exhaust-side passageway (33).

The upstream-side partition (71) is provided with four dampers (41-44) that can be opened/closed. Each of the dampers (41-44) is generally formed in a horizontally-oriented rectangular shape. Specifically, in a portion (upper portion) of the upstream-side partition (71) that is facing the room air-side passageway (32), the first room air-side damper (41) is attached on the right of the center partition (73), and the second room air-side damper (42) is attached on the left of the center partition (73). In a portion (lower portion) of the upstream-side partition (71) that is facing the outside air-side passageway (34), the first outside air-side damper (43) is attached on the right of the center partition (73), and the second outside air-side damper (44) is attached on the left of the center partition (73).

The downstream-side partition (72) is provided with four dampers (45-48) that can be opened/closed. Each of the dampers (45-48) is generally formed in a horizontally-oriented rectangular shape. Specifically, in a portion (upper portion) of the downstream-side partition (72) that is facing the air-supply-side passageway (31), the first air-supply-side damper (45) is attached on the right of the center partition (73), and the second air-supply-side damper (46) is attached on the left of the center partition (73). In a portion (lower portion) of the downstream-side partition (72) that is facing the exhaust-side passageway (33), the first exhaust-side damper (47) is attached on the right of the center partition (73), and the second exhaust-side damper (48) is attached on the left of the center partition (73).

In the casing (11), the space between the air-supply-side passageway (31) and the exhaust-side passageway (33) and the front surface panel portion (12) is partitioned by a partition (77) into left and right portions. Of the left and right partitioned spaces, the space on the right side of the partition (77) forms an air supply fan chamber (36), and the space on the left side of the partition (77) forms an exhaust fan chamber (35).

The air supply fan (26) is accommodated in the air supply fan chamber (36). The exhaust fan (25) is accommodated in the exhaust fan chamber (35). The air supply fan (26) and the exhaust fan (25) are each composed of a DC fan, and a humidity control controller (100) controls actuation of the fans (25, 26) during normal operation.

Specifically, these fans (25, 26) each include a fan rotor, a fan casing (86), and a fan motor (89). Although not shown in the figures, the fan rotor is formed in a cylindrical shape having an axial length that is shorter than its diameter, with many blades formed on the circumferential surface thereof. The fan rotor is accommodated in the fan casing (86). An inlet (87) is opened in one of the side surfaces (side surfaces that are perpendicular to the axial direction of the fan rotor) of the fan casing (86). The fan casing (86) is formed with a portion outwardly protruding from the circumferential surface thereof, with an outlet (88) being opened at the protruding end of that portion. The fan motor (89) is attached to a side surface of the fan casing (86) that is opposite to the inlet (87). The fan motor (89) is connected to the fan rotor to rotate the fan rotor.

In the air supply fan (26) and the exhaust fan (25), when the fan rotor is rotated by the fan motor (89), the air is sucked into the fan casing (86) through the inlet (87), and the air in the fan casing (86) is blown out of the outlet (88).

In the air supply fan chamber (36), the air supply fan (26) is placed in an orientation such that the inlet (87) of the fan casing (86) is facing the downstream-side partition (72). The outlet (88) of the fan casing (86) of the air supply fan (26) is attached to the first side surface panel portion (14) in a state where it communicates with the air supply opening (22).

In the exhaust fan chamber (35), the exhaust fan (25) is placed in an orientation such that the inlet (87) of the fan casing (86) is facing the downstream-side partition (72). The outlet (88) of the fan casing (86) of the exhaust fan (25) is attached to the second side surface panel portion (15) in a state where it communicates with the exhaust opening (21).

The compressor (53) and the four-way switching valve (54) of the refrigerant circuit (50) are accommodated in the air supply fan chamber (36). The compressor (53) and the four-way switching valve (54) are placed between the air supply fan (26) in the air supply fan chamber (36) and the partition (77).

In the casing (11), the space between the first partition (74) and the first side surface panel portion (14) forms a first bypass passageway (81). The starting end of the first bypass passageway (81) communicates only with the outside air-side passageway (34), and is blocked from the room air-side passageway (32). The terminal end of the first bypass passageway (81) is separated by a partition (78) from the air-supply-side passageway (31), the exhaust-side passageway (33), and the air supply fan chamber (36). A first bypass damper (83) is provided on a portion of the partition (78) that faces the air supply fan chamber (36).

In the casing (11), the space between the second partition (75) and the second side surface panel portion (15) forms a second bypass passageway (82). The starting end of the second bypass passageway (82) communicates only with the room air-side passageway (32), and is blocked from the outside air-side passageway (34). The terminal end of the second bypass passageway (82) is separated by a partition (79) from the air-supply-side passageway (31), the exhaust-side passageway (33), and the exhaust fan chamber (35). A second bypass damper (84) is provided on a portion of the partition (79) that faces the exhaust fan chamber (35).

Note that the first bypass passageway (81), the second bypass passageway (82), the first bypass damper (83), and the second bypass damper (84) are not shown in the right side view and the left side view of FIG. 8.

An electrical component box (90) is attached to a portion of the front surface panel portion (12) of the casing (11) closer to the right side. Note that the electrical component box (90) is omitted in FIGS. 6 and 8. The electrical component box (90) is a box of a rectangular parallelepiped shape, and accommodates therein a control substrate (91) and a power supply substrate (92). The control substrate (91) and the power supply substrate (92) are attached to the inner surface of one of the side plates of the electrical component box (90) that is adjacent to the front surface panel portion (12) (i.e., the rear plate). An inverter portion of the power supply substrate (92) is provided with radiator fins (93). The radiator fins (93) are protruding from the rear surface of the power supply substrate (92), and run through the rear plate of the electrical component box (90) and the front surface panel portion (12) of the casing (11) so as to be exposed to the air supply fan chamber (36) (see FIG. 7).

<Configuration of Refrigerant Circuit>

As illustrated in FIG. 9, the refrigerant circuit (50) is a closed circuit provided with the first adsorption heat exchanger (51), the second adsorption heat exchanger (52), the compressor (53), the four-way switching valve (54), and the electric expansion valve (55). The refrigerant circuit (50) allows refrigerant, filling the refrigerant circuit (50), to circulate therethrough to perform a vapor-compression refrigeration cycle.

In the refrigerant circuit (50), the compressor (53) has its discharge side connected to the first port of the four-way switching valve (54), and its suction side connected to the second port of the four-way switching valve (54). In the refrigerant circuit (50), the first adsorption heat exchanger (51), the electric expansion valve (55), and the second adsorption heat exchanger (52) are connected sequentially from the third port of the four-way switching valve (54) to the fourth port thereof.

Figure 9A:
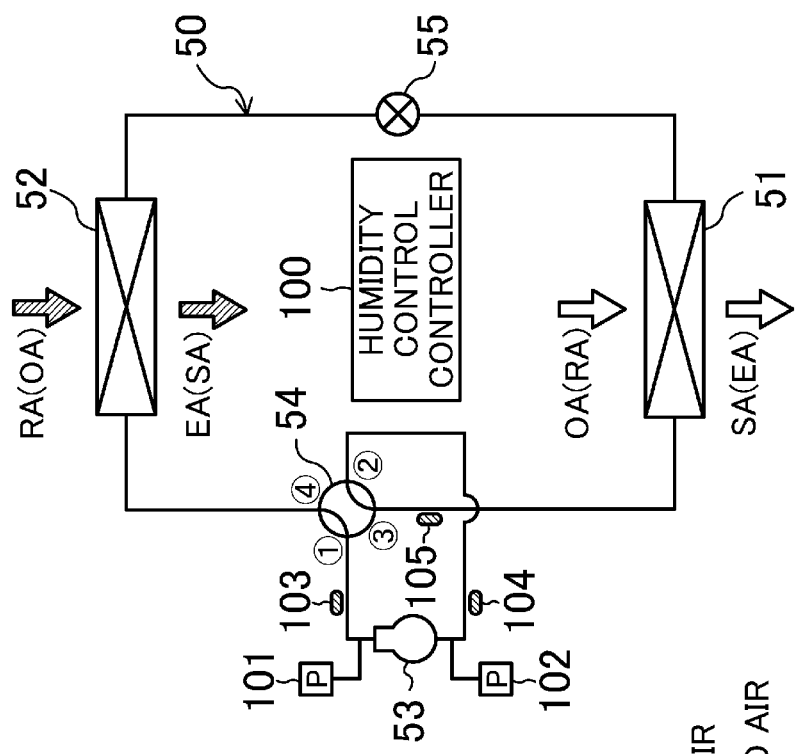
FIGS. 9(A) and 9(B) are piping system diagrams illustrating the configuration of a refrigerant circuit, where
Figure 9B:
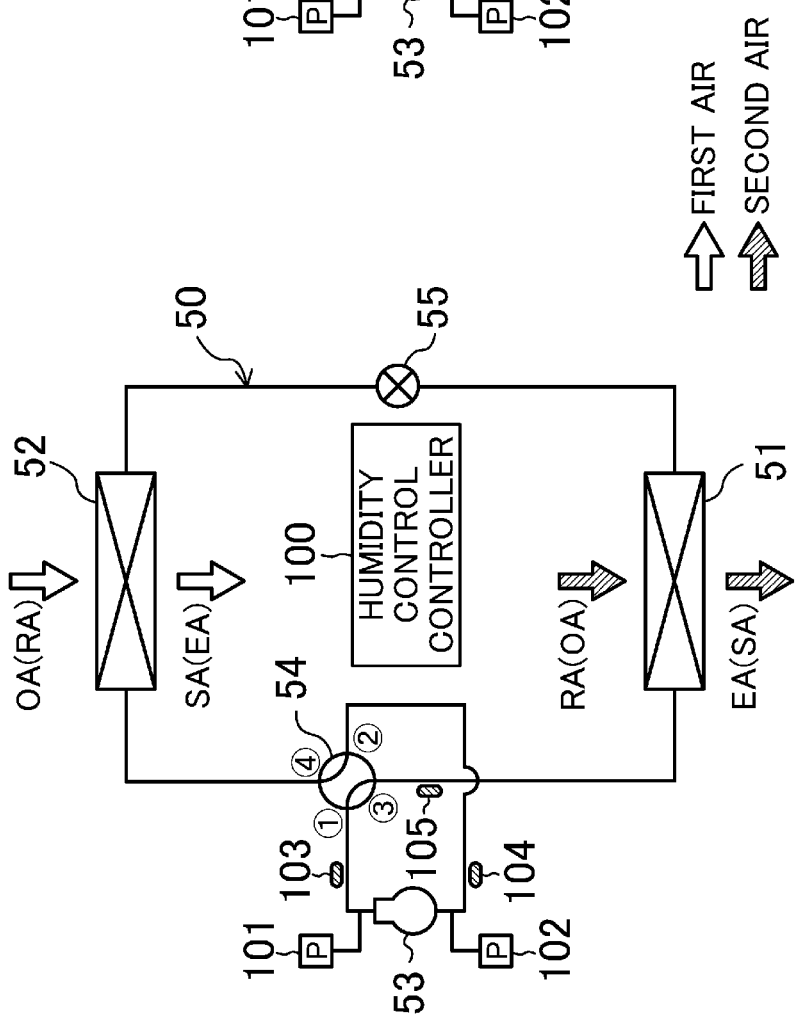

The four-way switching valve (54) can be switched between a first state (the state shown in FIG. 9(A)) in which the first port and the third port communicate with each other and the second port and the fourth port communicate with each other, and a second state (the state shown in FIG. 9(B)) in which the first port and the fourth port communicate with each other and the second port and the third port communicate with each other.

The compressor (53) is a hermetic compressor in which a compression mechanism configured to compress a refrigerant and an electric motor configured to drive the compression mechanism are accommodated in a single casing. A change in the frequency of alternating current fed to the electric motor of the compressor (51) (i.e., the operating frequency of the compressor (53)) changes the rotational speed of the compression mechanism driven by the electric motor, thereby changing the amount of the refrigerant discharged from the compressor (53) per unit time. That is, the capacity of the compressor (53) can be varied.

In the refrigerant circuit (50), a pipe connecting the discharge side of the compressor (53) and the first port of the four-way switching valve (54) together is provided with a high pressure sensor (101) and a discharge pipe temperature sensor (103). The high pressure sensor (101) measures the pressure of the refrigerant discharged from the compressor (53). The discharge pipe temperature sensor (103) measures the temperature of the refrigerant discharged from the compressor (53).

In the refrigerant circuit (50), a pipe connecting the suction side of the compressor (53) and the second port of the four-way switching valve (54) together is provided with a low pressure sensor (102) and a suction pipe temperature sensor (104). The low pressure sensor (102) measures the pressure of the refrigerant sucked into the compressor (53). The suction pipe temperature sensor (104) measures the temperature of the refrigerant sucked into the compressor (53).

In the refrigerant circuit (50), a pipe connecting the third port of the four-way switching valve (54) and the first adsorption heat exchanger (51) together is provided with a pipe temperature sensor (105). The pipe temperature sensor (105) is placed at a location along the pipe and in the vicinity of the four-way switching valve (54) to measure the temperature of the refrigerant flowing through the pipe.

<Configuration of Humidity Controlling Ventilation Device Controller>

Each of the humidity controlling ventilation devices (10) is provided with a humidity control controller (100) serving as a controller. In the humidity controlling ventilation device (10) of this embodiment, a microcontroller provided on the control substrate (91) forms the humidity control controller (100). Values measured by the room air humidity sensor (96), the room air temperature sensor (98), the outside air humidity sensor (97), and the outside air temperature sensor (99) are fed to the humidity control controller (100). Values measured by the sensors (91, 92, . . . ) provided within the refrigerant circuit (50) are also fed to the humidity control controller (100). The humidity control controller (100) controls operation of the humidity controlling ventilation device (10) based on the fed measured values. In the humidity controlling ventilation device (10), one of a dehumidifying ventilation mode, a humidifying ventilation mode, and a simple ventilation mode all described below is selected by control operation of the humidity control controller (100). The humidity control controller (100) controls operations of the dampers (41-48), the fans (25, 26), the compressor (53), the electric expansion valve (55), and the four-way switching valve (54) in each of the modes.

—Operating Modes—

The humidity controlling ventilation device (10) of this embodiment selectively performs one of the dehumidifying ventilation mode, the humidifying ventilation mode, and the simple ventilation mode. The humidity controlling ventilation device (10) performs the dehumidifying ventilation mode and the humidifying ventilation mode as normal modes.

<Dehumidifying Ventilation Mode>

The humidity controlling ventilation device (10) in the dehumidifying ventilation mode performs a first normal operation and a second normal operation, which will be described below, alternately with each other at intervals of a predetermined period (e.g., at intervals of 3-4 min). In the dehumidifying ventilation mode, the first bypass damper (83) and the second bypass damper (84) are always closed.

In the humidity controlling ventilation device (10) in the dehumidifying ventilation mode, the outside air is taken into the casing (11) through the outside-air inlet (24) as the first air, and the room air is taken into the casing (11) through the room-air inlet (23) as the second air.

Figure 10:
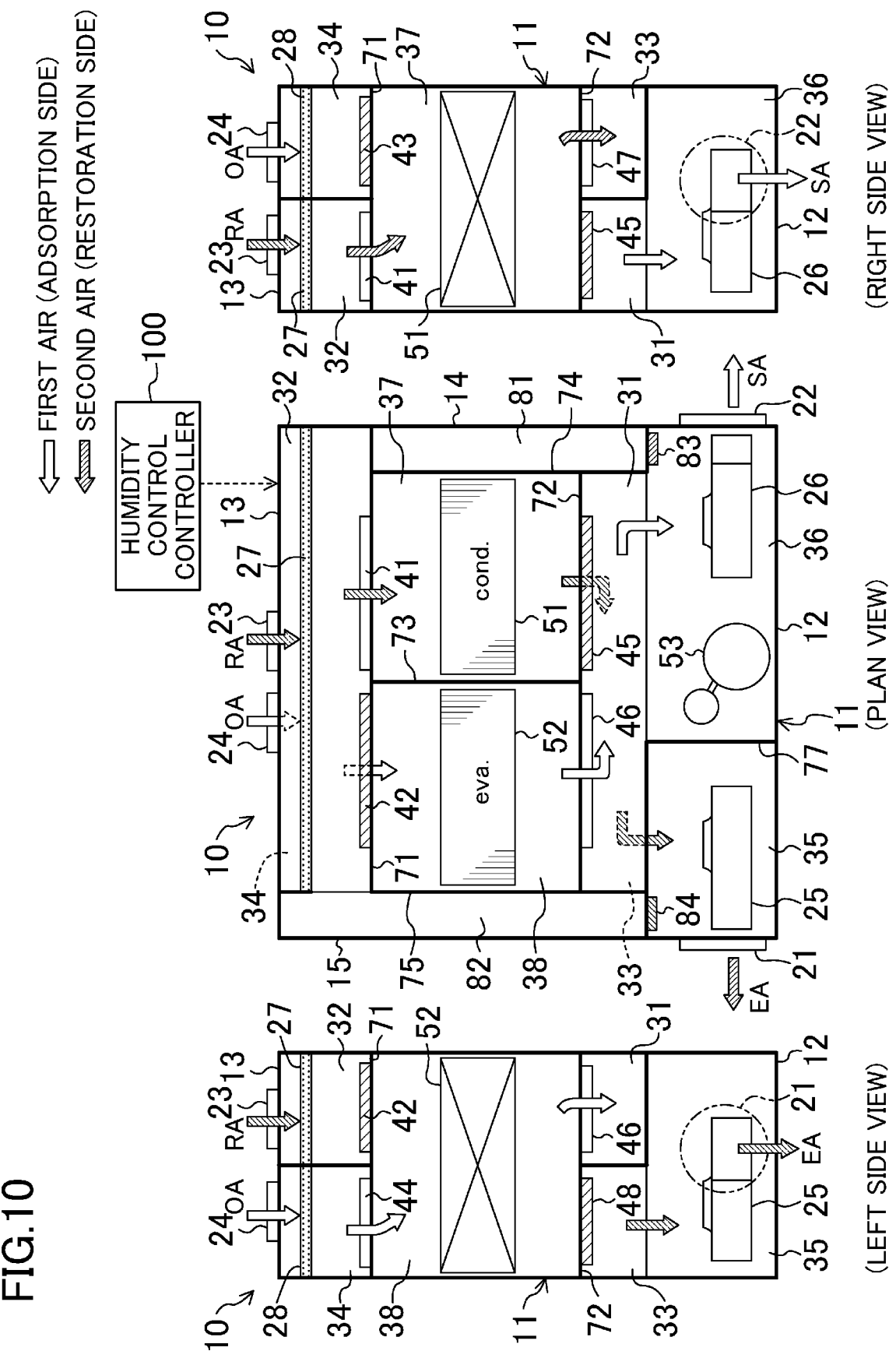
FIG. 10 illustrates a schematic plan view, a right side view, and a left side view of the humidity controlling ventilation device illustrating the flow of the air in the first normal operation of a dehumidifying ventilation mode.

First, the first normal operation of the dehumidifying ventilation mode will be described. As illustrated in FIG. 10, in the first normal operation, the first room air-side damper (41), the second outside air-side damper (44), the second air-supply-side damper (46), and the first exhaust-side damper (47) are open, and the second room air-side damper (42), the first outside air-side damper (43), the first air-supply-side damper (45), and the second exhaust-side damper (48) are closed. In the refrigerant circuit (50) in the first normal operation, the four-way switching valve (54) is set in the first state (as illustrated in FIG. 9(A)), the first adsorption heat exchanger (51) serves as a condenser, and the second adsorption heat exchanger (52) serves as an evaporator.

The first air, which has flowed into the outside air-side passageway (34) and has passed through the outside air-side filter (28), flows into the second heat exchanger chamber (38) through the second outside air-side damper (44), and then passes through the second adsorption heat exchanger (52). In the second adsorption heat exchanger (52), the moisture of the first air is adsorbed by the adsorbent, with the resulting heat of adsorption being absorbed by the refrigerant. The first air, which has been dehumidified through the second adsorption heat exchanger (52), flows into the air-supply-side passageway (31) through the second air-supply-side damper (46), and is supplied into the room through the air supply opening (22) after passing through the air supply fan chamber (36).

On the other hand, the second air, which has flowed into the room air-side passageway (32) and has passed through the room air-side filter (27), flows into the first heat exchanger chamber (37) through the first room air-side damper (41), and then passes through the first adsorption heat exchanger (51). In the first adsorption heat exchanger (51), the moisture is desorbed from the adsorbent heated by the refrigerant, and the desorbed moisture is given to the second air. The second air, which has been given the moisture through the first adsorption heat exchanger (51), flows into the exhaust-side passageway (33) through the first exhaust-side damper (47), and is discharged to the outside through the exhaust opening (21) after passing through the exhaust fan chamber (35).

Figure 11:
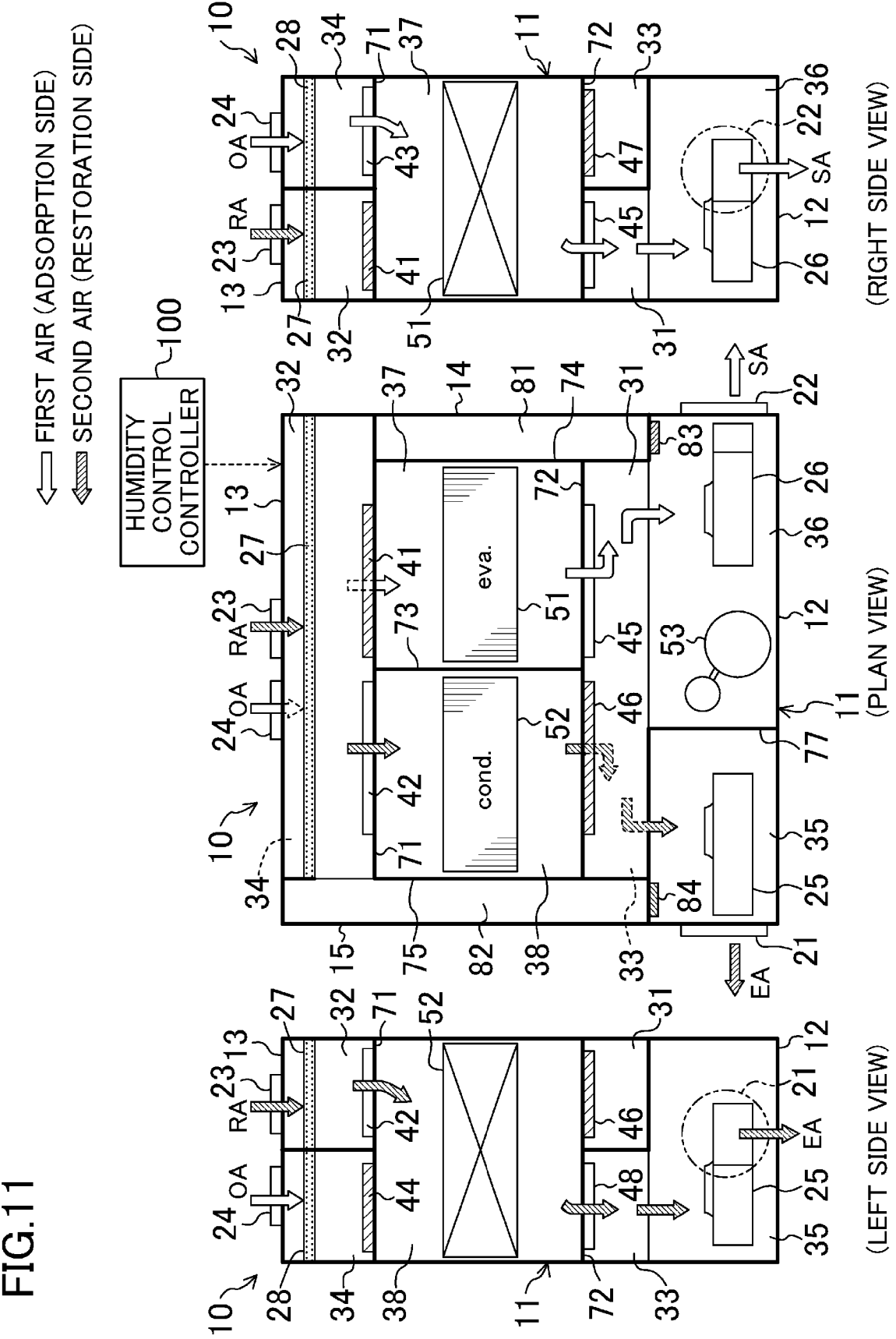
FIG. 11 illustrates a schematic plan view, a right side view, and a left side view of the humidity controlling ventilation device illustrating the flow of the air in the second normal operation of the dehumidifying ventilation mode.

Next, the second normal operation in the dehumidifying ventilation mode will be described. As illustrated in FIG. 11, in the second normal operation, the second room air-side damper (42), the first outside air-side damper (43), the first air-supply-side damper (45), and the second exhaust-side damper (48) are open, and the first room air-side damper (41), the second outside air-side damper (44), the second air-supply-side damper (46), and the first exhaust-side damper (47) are closed. In the refrigerant circuit (50) in the second normal operation, the four-way switching valve (54) is set in the second state (as illustrated in FIG. 9(B)), the first adsorption heat exchanger (51) serves as the evaporator, and the second adsorption heat exchanger (52) serves as the condenser.

The first air, which has flowed into the outside air-side passageway (34) and has passed through the outside air-side filter (28), flows into the first heat exchanger chamber (37) through the first outside air-side damper (43), and then passes through the first adsorption heat exchanger (51). In the first adsorption heat exchanger (51), the moisture of the first air is adsorbed by the adsorbent, with the resulting heat of adsorption being absorbed by the refrigerant. The first air, which has been dehumidified through the first adsorption heat exchanger (51), flows into the air-supply-side passageway (31) through the first air-supply-side damper (45), and is supplied into the room through the air supply opening (22) after passing through the air supply fan chamber (36).

On the other hand, the second air, which has flowed into the room air-side passageway (32) and has passed through the room air-side filter (27), flows into the second heat exchanger chamber (38) through the second room air-side damper (42), and then passes through the second adsorption heat exchanger (52). In the second adsorption heat exchanger (52), the moisture is desorbed from the adsorbent heated by the refrigerant, and the desorbed moisture is given to the second air. The second air, which has been given the moisture through the second adsorption heat exchanger (52), flows into the exhaust-side passageway (33) through the second exhaust-side damper (48), and is discharged to the outside through the exhaust opening (21) after passing through the exhaust fan chamber (35).

<Humidifying Ventilation Mode>

The humidity controlling ventilation device (10) in the humidifying ventilation mode performs a first normal operation and a second normal operation, which will be described below, alternately with each other at intervals of a predetermined period (e.g., at intervals of 3-4 min). In the humidifying ventilation mode, the first bypass damper (83) and the second bypass damper (84) are always closed.

In the humidity controlling ventilation device (10) in the humidifying ventilation mode, the outside air is taken into the casing (11) through the outside-air inlet (24) as the second air, and the room air is taken into the casing (11) through the room-air inlet (23) as the first air.

Figure 12:
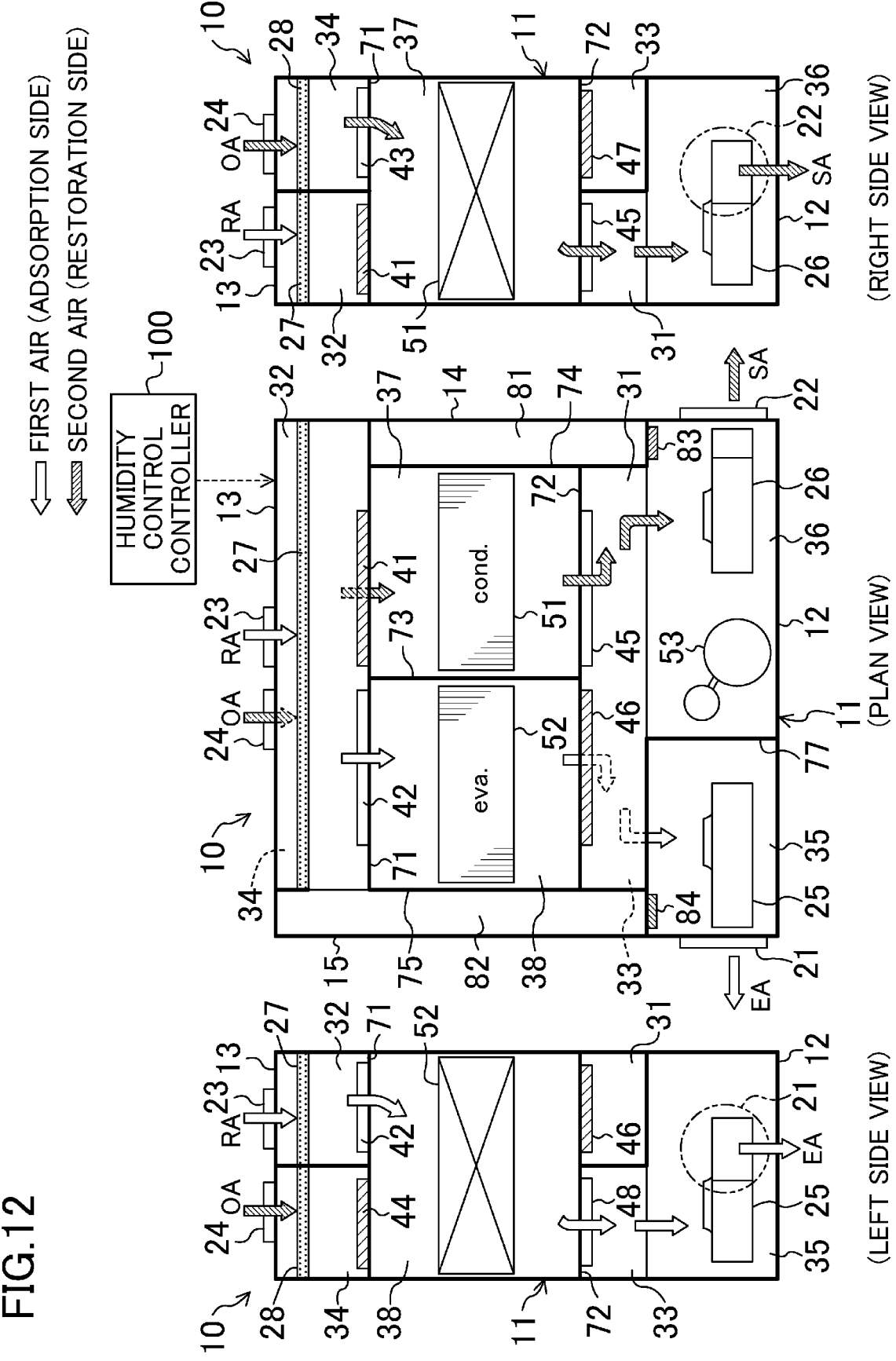
FIG. 12 illustrates a schematic plan view, a right side view, and a left side view of the humidity controlling ventilation device illustrating the flow of the air in the first normal operation of a humidifying ventilation mode.

First, the first normal operation of the humidifying ventilation mode will be described. As illustrated in FIG. 12, in the first normal operation, the second room air-side damper (42), the first outside air-side damper (43), the first air-supply-side damper (45), and the second exhaust-side damper (48) are open, and the first room air-side damper (41), the second outside air-side damper (44), the second air-supply-side damper (46), and the first exhaust-side damper (47) are closed. In the refrigerant circuit (50) in the first normal operation, the four-way switching valve (54) is set in the first state (as illustrated in FIG. 9(A)), the first adsorption heat exchanger (51) serves as the condenser, and the second adsorption heat exchanger (52) serves as the evaporator.

The first air, which has flowed into the room air-side passageway (32) and has passed through the room air-side filter (27), flows into the second heat exchanger chamber (38) through the second inside air-side damper (42), and then passes through the second adsorption heat exchanger (52). In the second adsorption heat exchanger (52), the moisture of the first air is adsorbed by the adsorbent, with the resulting heat of adsorption being absorbed by the refrigerant. The first air, which has been deprived of the moisture through the second adsorption heat exchanger (52), flows into the exhaust-side passageway (33) through the second exhaust-side damper (48), and is discharged to the outside through the exhaust opening (21) after passing through the exhaust fan chamber (35).

On the other hand, the second air, which has flowed into the outside air-side passageway (34) and has passed through the outside air-side filter (28), flows into the first heat exchanger chamber (37) through the first outside air-side damper (43), and then passes through the first adsorption heat exchanger (51). In the first adsorption heat exchanger (51), the moisture is desorbed from the adsorbent heated by the refrigerant, and the desorbed moisture is given to the second air. The second air, which has been humidified through the first adsorption heat exchanger (51), flows into the air-supply-side passageway (31) through the first air-supply-side damper (45), and is supplied into the room through the air supply opening (22) after passing through the air supply fan chamber (36).

Figure 13:
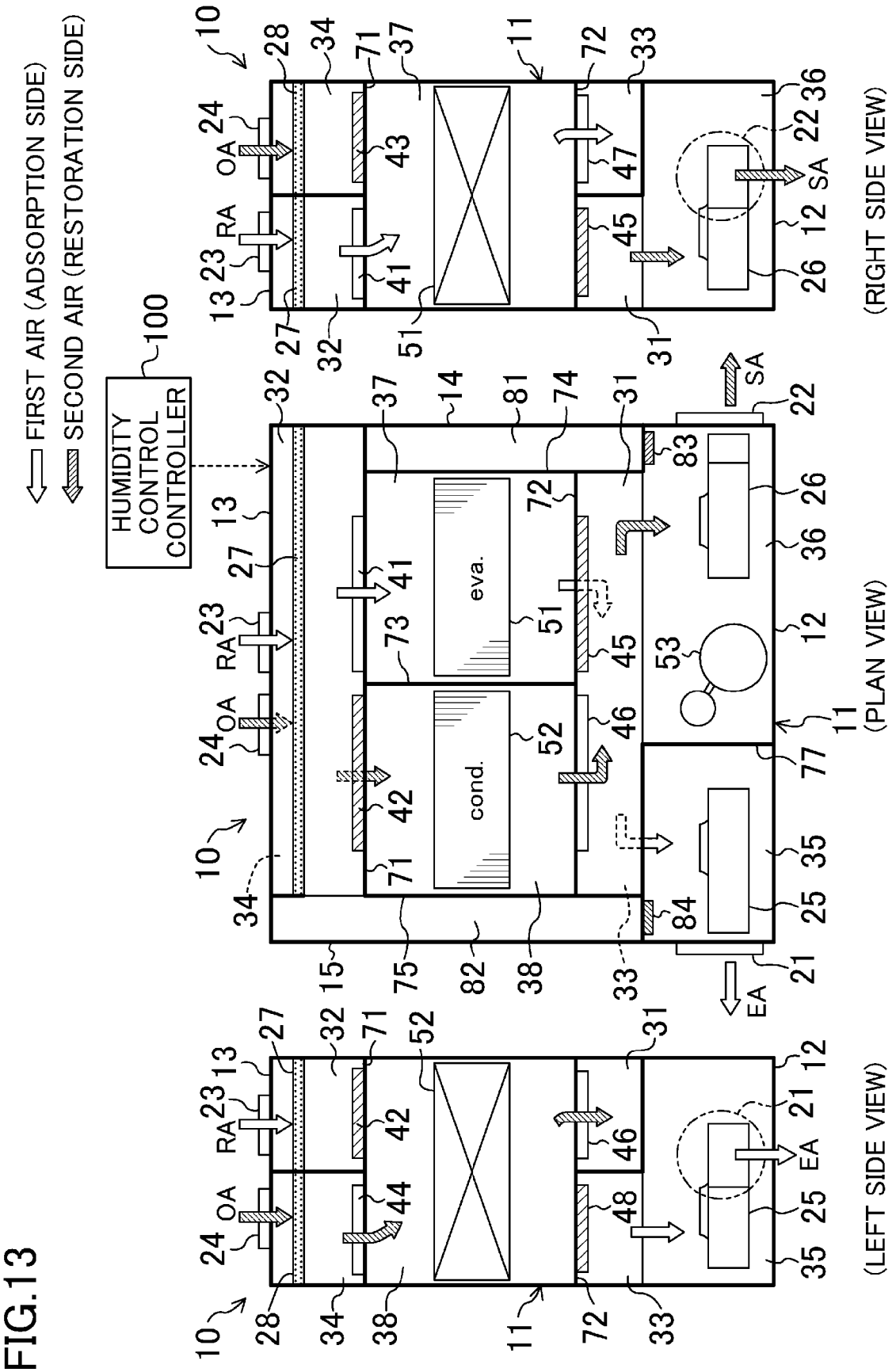
FIG. 13 illustrates a schematic plan view, a right side view, and a left side view of the humidity controlling ventilation device illustrating the flow of the air in the second normal operation of the humidifying ventilation mode.

Next, the second normal operation in the humidifying ventilation mode will be described. As illustrated in FIG. 13, in the second normal operation, the first room air-side damper (41), the second outside air-side damper (44), the second air-supply-side damper (46), and the first exhaust-side damper (47) are open, and the second room air-side damper (42), the first outside air-side damper (43), the first air-supply-side damper (45), and the second exhaust-side damper (48) are closed. In the refrigerant circuit (50) in the second normal operation, the four-way switching valve (54) is set in the second state (as illustrated in FIG. 9(B)), the first adsorption heat exchanger (51) serves as the evaporator, and the second adsorption heat exchanger (52) serves as the condenser.

The first air, which has flowed into the room air-side passageway (32) and has passed through the room air-side filter (27), flows into the first heat exchanger chamber (37) through the first room air-side damper (41), and then passes through the first adsorption heat exchanger (51). In the first adsorption heat exchanger (51), the moisture of the first air is adsorbed by the adsorbent, with the resulting heat of adsorption being absorbed by the refrigerant. The first air, which has been deprived of the moisture through the first adsorption heat exchanger (51), flows into the exhaust-side passageway (33) through the first exhaust-side damper (47), and is discharged to the outside through the exhaust opening (21) after passing through the exhaust fan chamber (35).

On the other hand, the second air, which has flowed into the outside air-side passageway (34) and has passed through the outside air-side filter (28), flows into the second heat exchanger chamber (38) through the second outside air-side damper (44), and then passes through the second adsorption heat exchanger (52). In the second adsorption heat exchanger (52), the moisture is desorbed from the adsorbent heated by the refrigerant, and the desorbed moisture is given to the second air. The second air, which has been humidified through the second adsorption heat exchanger (52), flows into the air-supply-side passageway (31) through the second air-supply-side damper (46), and is supplied into the room through the air supply opening (22) after passing through the air supply fan chamber (36).

<Simple Ventilation Mode>

Figure 14:
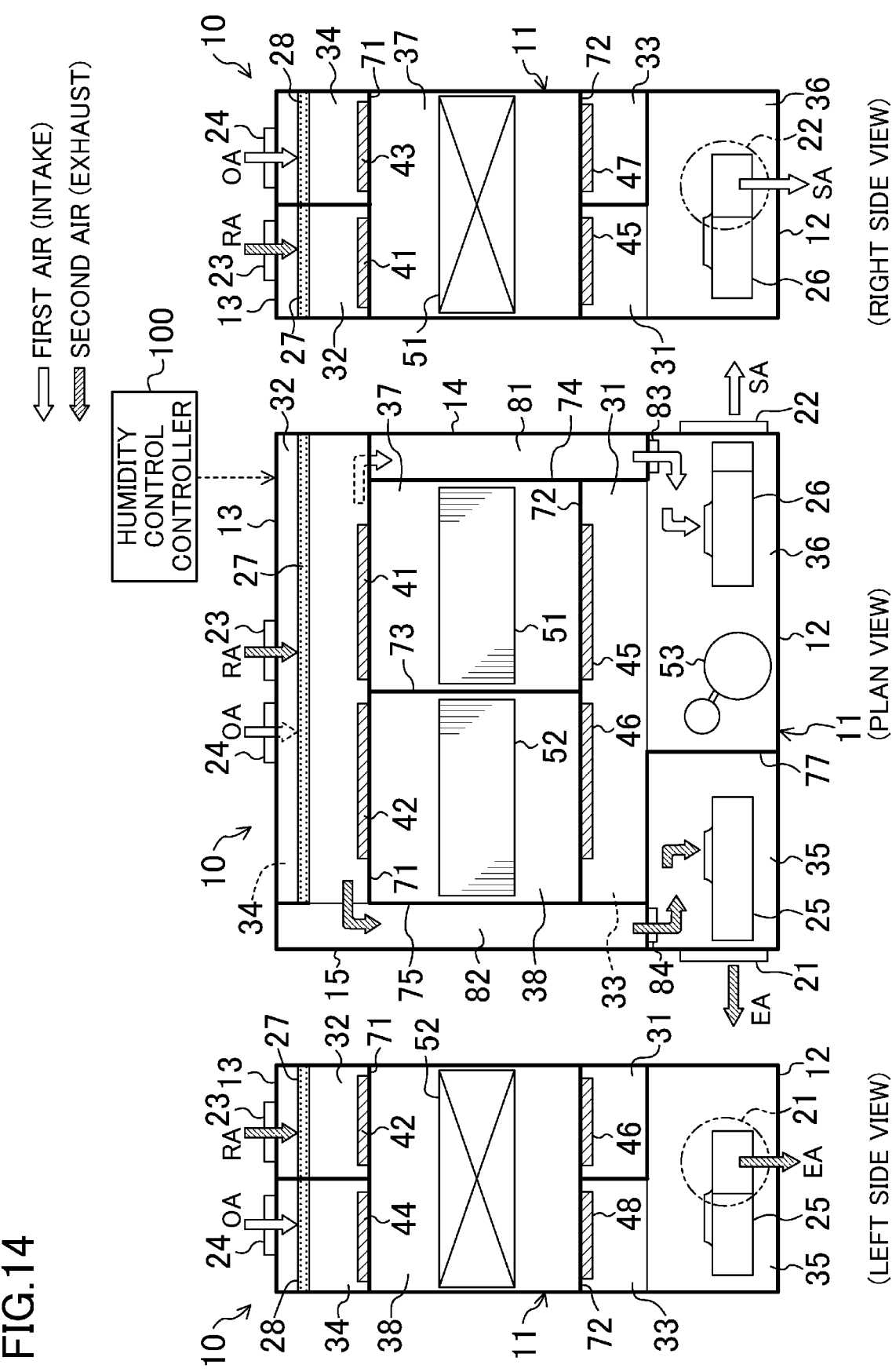
FIG. 14 illustrates a schematic plan view, a right side view, and a left side view of the humidity controlling ventilation device illustrating the flow of the air in a simple ventilation mode.

The humidity controlling ventilation device (10) in the simple ventilation mode supplies taken outside air (OA) itself as supply air (SA) into the room, and simultaneously discharges taken room air (RA) itself as ejection air (EA) to the outside. Here, the operation of the humidity controlling ventilation device (10) in the simple ventilation mode will be described with reference to FIG. 14.

In the humidity controlling ventilation device (10) in the simple ventilation mode, the first bypass damper (83) and the second bypass damper (84) are open, and the first room air-side damper (41), the second room air-side damper (42), the first outside air-side damper (43), the second outside air-side damper (44), the first air-supply-side damper (45), the second air-supply-side damper (46), the first exhaust-side damper (47), and the second exhaust-side damper (48) are closed. In the simple ventilation mode, the compressor (53) of the refrigerant circuit (50) is shut down.

In the humidity controlling ventilation device (10) in the simple ventilation mode, the outside air is taken into the casing (11) through the outside-air inlet (24). The outside air, which has flowed into the outside air-side passageway (34) through the outside-air inlet (24), flows into the air supply fan chamber (36) through the first bypass passageway (81) and the first bypass damper (83), and is then supplied into the room through the air supply opening (22).

In the humidity controlling ventilation device (10) in the simple ventilation mode, the room air is taken into the casing (11) through the room-air inlet (23). The room air, which has flowed into the room air-side passageway (32) through the room-air inlet (23), flows into the exhaust fan chamber (35) through the second bypass passageway (82) and the second bypass damper (84), and is then discharged to the outside through the exhaust opening (21).

Advantages of Embodiment

According to this embodiment, when the power consumed by one or more of the first through (N−1)-th humidity controlling ventilation devices (10a, 10b, 10c, . . . ) varies by changing the rotational speed of the air supply fan (25) (or the exhaust fan (26)) of the N-th humidity controlling ventilation device (10n), the N-th humidity controlling ventilation device (10n) is automatically determined to be connected to one of the air-supply ducts (1a, 2a, 3a) to which the one or more of the first through (N−1)-th humidity controlling ventilation devices (10a, 10b, 10c, . . . ) is also connected. Therefore, one of the air-supply ducts (1a, 2a, 3a) to which the N-th humidity controlling ventilation device (10n) is connected can be automatically determined. Consequently, the air flow rate of the ventilation system (S) can be accurately adjusted.

When the power consumed by one or more of the first through (N−1)-th humidity controlling ventilation devices (10a, 10b, 10c, . . . ) decreases by increasing the rotational speed of the air supply fan (25) of the N-th humidity controlling ventilation device (10n), the N-th humidity controlling ventilation device (10n) is automatically determined to be connected to one of the air-supply ducts (1a, 2a, 3a) to which the one or more of the first through (N−1)-th humidity controlling ventilation devices (10a, 10b, 10c, . . . ) is also connected. Therefore, one of the air-supply ducts (1a, 2a, 3a) to which the N-th humidity controlling ventilation device (10n) is connected can be automatically determined. Consequently, the air flow rate of the ventilation system (S) can be accurately adjusted.

When the number of ventilation devices connected to a duct is changed after introduction of a ventilation system, the rotational speeds of fans have conventionally needed to be again adjusted to provide a predetermined ventilation flow rate. Specifically, a method is used in which the rotational speeds of the fans are previously determined depending on the number of the connected ventilation devices. Alternatively, a method may be used in which the power required to provide a predetermined ventilation flow rate is calculated based on the rotational speeds of the fans to control the rotational speeds of the fans based on the gap between the calculated required power and the consumed power during operation.

The number of ventilation devices connected to a duct is often changed in a short time, and the method may be always performed. Therefore, if the estimated number of ventilation devices connected to the duct is different from the actual number of ventilation devices connected to the duct, the air flow rate of each of the ventilation devices may be insufficient.

However, in this embodiment, one or more of ventilation devices connected to each of the duct banks (1, 2, 3) can be automatically determined. Consequently, the air flow rate of the ventilation system (S) can be accurately adjusted.

Fluctuations in the power consumed by each of the first through (N-1)-th humidity controlling ventilation devices (10a, 10b, 10c, ...) are monitored, and thus, in the event of abnormal conditions, e.g., clogging of any one of the duct banks (1-3) with foreign matter, a determination can be reliably made which of the duct banks (1, 2, 3) has been in an abnormal situation, or whether or not the other ducts have been in an abnormal situation.

Variation of Embodiment

Next, a variation of this embodiment will be described. In the embodiment, for example, a material principally capable of adsorbing water vapor, such as zeolite or silica gel, is used as the adsorbent. However, in the present invention, the adsorbent is not limited to the material, and a material capable of both adsorbing and absorbing water vapor (a so-called sorbent) may be used.

Specifically, in this variation, a hygroscopic organic polymeric material is used as an adsorbent. In the organic polymeric material used as an adsorbent, a plurality of polymer backbones having hydrophilic polar groups in molecules are cross-linked, and the cross-linked polymer backbones form a three-dimensional structure.

The adsorbent of this embodiment swells by taking water vapor (i.e., moisture absorption). A mechanism in which this adsorbent swells by moisture absorption is assumed to be as follows. Specifically, when the adsorbent absorbs moisture, water vapor is adsorbed on hydrophilic polar groups, and an electrical load caused by reaction between the hydrophilic polar groups and water vapor acts on polymer backbones, resulting in deformation of the polymer backbones. Then, water vapor is taken in the clearance between the deformed polymer backbones due to capillarity, thereby causing the three-dimensional structures of the polymer backbones to swell. As a result, the volume of the adsorbent increases.

In this manner, with respect to the adsorbent of this embodiment, both adsorption of water vapor on the adsorbent and absorption of water vapor in the adsorbent occur. That is, water vapor is sorbed on the adsorbent. The water vapor taken by the adsorbent enters not only the surface of the three-dimensional structure of a plurality of cross-linked polymer backbones but also the inside of this three-dimensional structure. Consequently, a large amount of water vapor is taken by the adsorbent, as compared to, for example, zeolite which allows adsorption of water vapor only on its surface.

In addition, this adsorbent contracts by desorbing water vapor (i.e., desorbing moisture). Specifically, when the adsorbent desorbs moisture, the amount of water taken in the clearance between polymer backbones decreases, and the shape of the three-dimensional structure of polymer backbones gradually recovers, thereby causing the volume of the adsorbent to decrease.

The material used as the adsorbent of this embodiment is not limited to the material described above as long as the adsorbent swells by moisture absorption and contracts by moisture desorption. The material used as the adsorbent may be a hygroscopic ion-exchange resin, for example.

Other Embodiments

In the present invention, the embodiment may be configured as follows.

In the embodiment, the humidity controlling ventilation devices (10) and the booster fan (4) are used as ventilation devices. However, in the present invention, the ventilation devices are not limited to the devices and fan, and may be total heat exchange ventilation devices.

In the embodiment, the actuation of the air supply fan (26) of the N-th humidity controlling ventilation device (10n) decreases the power consumed by the air supply fans (26-26) of some of the first through (N-1)-th humidity controlling ventilation devices (10a-10n-1), and thus, the duct to which the N-th humidity controlling ventilation device (10n) is connected is determined to be the second air-supply duct (2a) to which the second humidity controlling ventilation device (10b) and the sixth humidity controlling ventilation device (10f), ... are also connected. However, in the present invention, a determination process is not limited to the above-described process. The air supply fan (26) of the N-th humidity controlling ventilation device (10n) may be driven at a predetermined rotational speed, and then, while the rotational speeds of the air supply fans (26-26) of the first through (N-1)-th humidity controlling ventilation devices (10a-10n-1) are maintained at a predetermined rotational speed, the rotational speed of the air supply fan (26) of the N-th humidity controlling ventilation device (10n) may be decreased. In this case, the power detector (5b) detects that the decrease in the rotational speed of the air supply fan (26) of the N-th humidity controlling ventilation device (10n) increases the power consumed by the air supply fan (26) of each of the second humidity controlling ventilation device (10b), the sixth humidity controlling ventilation device (10f), .... Then, the connection determinator (5c) determines, based on the fact that the decrease in the rotational speed of the air supply fan (26) of the N-th humidity controlling ventilation device (10n) increases the power consumed by the air supply fan (26) of each of the second humidity controlling ventilation device (10b), the sixth humidity controlling ventilation device (10f), ..., that the duct to which the N-th humidity controlling ventilation device (10n) is connected is the second air-supply duct (2a) to which the second humidity controlling ventilation device (10b), the sixth humidity controlling ventilation device (10f), ... are also connected. The exhaust ducts (1b, 2b, 3b) are similar to the air-supply ducts (1a, 2a, 3a), and thus, the explanation thereof is omitted.

According to this embodiment, based on the fact that the decrease in the rotational speed of the air supply fan (26) of the N-th humidity controlling ventilation device (10n) increases the power consumed by one or more of the first through (N-1)-th humidity controlling ventilation devices (10a, 10b, 10c, ...), the N-th humidity controlling ventilation device (10n) is automatically determined to be connected to one of the air-supply ducts (1a, 2a, 3a) to which the one or more of the first through (N-1)-th-humidity controlling ventilation devices (10a, 10b, 10c, ...) is also connected. Therefore, one of the air-supply ducts (1a, 2a, 3a) to which the N-th humidity controlling ventilation device (10n) is connected can be automatically determined. Consequently, the air flow rate of the ventilation system (S) can be accurately adjusted.

In the embodiment, the ventilation controller (5) includes the single fan controller (5a) configured to control the fans (25, 26) of the humidity controlling ventilation devices (10a-10n) and the booster fan (4). However, in the present invention, a ventilation controller is not limited to the above-described ventilation controller, and the humidity controlling ventilation devices (10a-10n) and the booster fan (4) may each include a fan controller (5a) to control the fans (25, 26) of the humidity controlling ventilation devices (10a-10n) and the booster fan (4).

In the embodiment, the ventilation controller (5) includes the single fan controller (5a) configured to control the fans (25, 26) of the humidity controlling ventilation devices (10a-10n) and the booster fan (4). However, in the present invention, a ventilation controller is not limited to the above-described ventilation controller. The humidity controlling ventilation devices (10a-10n) and the booster fan (4) may each include a controller, and the fans may be controlled individually. Specifically, a single fan controller may be connected to each of the humidity controlling ventilation devices (10a-10n) and the booster fan (4). The fan controllers may control actuation of the fan motors of the fans (4, 25, 26) individually based on signals from the fan controller (5a), and may drive the fans (4, 25, 26) while maintaining the rotational speeds of the fans (4, 25, 26) at a predetermined rotational speed. The fan controllers and the fan controller (5a) form a fan controller according to the present invention.

In the embodiment, the ventilation controller (5) includes the single power detector (5b) configured to detect the power consumed by the fans (25, 26) of the humidity controlling ventilation devices (10a-10n) and the booster fan (4) during the operation of each of the fans. However, in the present invention, a ventilation controller is not limited to the above-described ventilation controller. The humidity controlling ventilation devices (10a-10n) and the booster fan (4) may each include the power detector (5b) to detect the power consumed by the fans during the operation of each of the fans. Specifically, the power detector (5b) may be connected to the fan motors of the air supply fan (26) and the exhaust fan (25) of one of the humidity controlling ventilation devices (10a-10n) or the fan motor of the booster fan (4) to detect the power consumed by the corresponding fan. The power detector (5b) feeds data of the detected consumed power to the ventilation controller (5).

In the embodiment, the ventilation controller (5) includes the single connection determinator (5c) configured to determine the duct banks (1, 2, 3) to which the humidity controlling ventilation devices (10a-10n) and the booster fan (4) belong. However, in the present invention, a ventilation controller is not limited to the above-described ventilation controller. Each of the humidity controlling ventilation devices (10a-10n) and the booster fan (4) may include the connection determinator (5c) to determine the duct banks (1, 2, 3) to which the humidity controlling ventilation devices (10a-10n) and the booster fan (4) belong.

The embodiments are set forth merely for the purposes of preferred examples in nature, and are not intended to limit the scope, applications, and use of the invention.

INDUSTRIAL APPLICABILITY

As described above, the present invention is useful for ventilation systems in which a plurality of ventilation devices are connected to ducts.

DESCRIPTION OF REFERENCE CHARACTERS

1 FIRST DUCT BANK
1a FIRST AIR-SUPPLY DUCT
1b FIRST EXHAUST DUCT
2 SECOND DUCT BANK
2a SECOND AIR-SUPPLY DUCT
2b SECOND EXHAUST DUCT
3 THIRD DUCT BANK
3a THIRD AIR-SUPPLY DUCT
3b THIRD EXHAUST DUCT
4 BOOSTER FAN
5a FAN CONTROL UNIT
5b POWER DETECTION UNIT
5c CONNECTION DETERMINATION UNIT
10 HUMIDITY CONTROLLING VENTILATION DEVICE
25 EXHAUST FAN
26 AIR SUPPLY FAN

The invention claimed is:
1. A ventilation system comprising:
a plurality of ventilation devices comprising first through x-th ventilation devices, where x is greater than 1, each of the plurality of ventilation devices including an air blowing fan;
a plurality of ducts to which the ventilation devices are connected;
a fan controller configured to control a rotational speed of a respective air blowing fan of each of the plurality of ventilation devices;
a power detector configured to detect a fluctuation in power consumed by the air blowing fan of each of the plurality of ventilation devices; and
a connection determiner configured to perform an iterative process of grouping the plurality of ventilation devices based on the plurality of ducts to which the plurality of ventilation devices are respectively connected, with one of the plurality of ventilation devices being designated a determination ventilation device and another one of the plurality of ventilation devices being designated a specific ventilation device during each iteration of the process, and a counter being initialized as N=I, the process including:
(1) designating the (N+1)-th ventilation device as the determination ventilation device,
(2) successively designating each of the first through N-th ventilation devices as the specific ventilation device and, while each of the first through N-th ventilation devices is designated as the specific ventilation device, determining whether the determination ventilation device is also connected to a same one of the plurality of ducts as the specific ventilation device on the basis of whether the power detector detects a fluctuation in the power consumed by the corresponding air blowing fan of the specific ventilation device in response to the fan controller changing the rotational speed of the corresponding air blowing fan of the determination ventilation device while the corresponding air blowing fan of the specific ventilation device is being driven by the fan controller, and
(3) if N+1 is less than X, incrementing the counter N by one, and returning to (1), wherein:
in (2), while each of the first through N-th ventilation devices is designated as the specific ventilation device, the determination ventilation device is determined to be connected to the same duct as the specific ventilation device if the power detector detects the fluctuation in the power consumed by the corresponding air blowing fan of the specific ventilation device in response to the changing of rotational speed of the corresponding air blowing fan of the determination ventilation device, and the determination ventilation device is determined to be connected to a different duct than the specific duct if the corresponding power detector does not detect the fluctuation in the power consumed by the corresponding air blowing fan of the specific ventilation device in response to the changing of rotational speed of the corresponding air blowing fan of the determination ventilation device, on the basis of the process, the connection determiner determines which and how many of the plurality of ventilation devices are connected to each of the plurality of ducts, and for each of the plurality of ventilation devices connected to a specific one of the plurality of ducts, the fan controller controls the rotational speed of the corresponding air blowing fan, based on the determined number of the plurality of ventilation devices connected to the specific one of the plurality of ducts to maintain a desired flow rate for the specific one of the plurality of ducts.

2. The ventilation system of claim 1, wherein in (2), while each of the first through N-th ventilation devices is designated as the specific ventilation device, the determination ventilation device and the specific ventilation device are determined to be connected to the same duct in a situation where when the rotational speed of the corresponding air blowing fan of the determination ventilation device is increased, the power consumed by the corresponding air blowing fan of the specific ventilation device decreases.

3. The ventilation system of claim 1, wherein in (2), while each of the first through N-th ventilation devices is designated as the specific ventilation device, the determination ventilation device and the specific ventilation device are determined to be connected to the same duct in a situation where when the rotational speed of the corresponding air blowing fan of the determination ventilation device is decreased, the power consumed by the corresponding air blowing fan of the specific ventilation device increases.

* * * * *